United States Patent
Nonomiya

(10) Patent No.: US 8,322,676 B2
(45) Date of Patent: Dec. 4, 2012

(54) SLIDE STRUCTURE OF VEHICLE SEAT

(75) Inventor: Masaaki Nonomiya, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 174 days.

(21) Appl. No.: 12/806,145

(22) Filed: Aug. 6, 2010

(65) Prior Publication Data

US 2011/0057085 A1   Mar. 10, 2011

(30) Foreign Application Priority Data

Sep. 4, 2009   (JP) .................................. 2009-204510

(51) Int. Cl.
*F16M 13/00* (2006.01)
(52) U.S. Cl. ..................................... 248/429; 297/344.1
(58) Field of Classification Search .................. 248/424, 248/425, 429, 430; 297/344.1
See application file for complete search history.

(56) References Cited

U.S. PATENT DOCUMENTS

| | | | | |
|---|---|---|---|---|
| 5,222,814 A * | 6/1993 | Boelryk | ........................... | 384/47 |
| 5,893,545 A * | 4/1999 | Lyons et al. | .................. | 248/420 |
| 6,145,914 A * | 11/2000 | Downey et al. | ............ | 296/65.18 |
| 6,264,158 B1 * | 7/2001 | Downey et al. | ................ | 248/422 |
| 6,318,696 B1 * | 11/2001 | Downey et al. | ................ | 248/430 |
| 6,354,553 B1 * | 3/2002 | Lagerweij et al. | ............ | 248/430 |
| 7,048,244 B2 * | 5/2006 | Hauck | ........................... | 248/430 |

* cited by examiner

*Primary Examiner* — Terrell McKinnon
*Assistant Examiner* — Steven Marsh
(74) *Attorney, Agent, or Firm* — Flynn, Thiel, Boutell & Tanis, P.C.

(57) ABSTRACT

A slide structure of a vehicle seat is capable of maintaining an aesthetic external appearance and a safety of the vehicle seat and has a stationary outer rail which extends in the longitudinal direction of the vehicle and includes a substantially C-shaped cross-section an opening portion of which is oriented inwardly in the widthwise direction of the vehicle and is disposed to exhibit an elongated cross-section in the vertical direction of the vehicle, and a movable inner rail which extends in the longitudinal direction of the vehicle and fits over said stationary outer rail so as to be slidable in the longitudinal direction of the vehicle relative to said stationary outer rail and is fixed on the seat cushion.

8 Claims, 20 Drawing Sheets

SLIDE STRUCTURE OF VEHICLE SEAT

FIELD OF THE INVENTION

The present invention relates to a slide structure of a vehicle seat, particularly relates to the slide structure of the vehicle seat which is capable of maintaining an aesthetic external appearance and a safety of the vehicle seat.

BACKGROUND OF THE INVENTION

Conventionally, a slide structure has been provided on a seat cushion of a vehicle seat to position, and thus fix the vehicle seat at a desired position in a longitudinal direction of the vehicle through the seat cushion.

Explaining the slide structure, it comprises a stationary rail extending in the longitudinal direction of the vehicle and including a substantially C-shaped cross-section and is arranged to be an elongated cross-section in the vertical direction of the vehicle, and a movable rail extending in the longitudinal direction of the vehicle and fitting with the stationary rail so as to be slidable in the longitudinal direction relative to the stationary rail. The movable rail is fixed on the seat cushion and includes a substantially C-shaped cross-section and is arranged to be an elongated cross-section in the vertical direction of the vehicle. The movable rail fits with the stationary rail with opening portions formed by the respective C-shaped cross-sections facing each other in such a way that in a case where the seat cushion is to be positioned to be the most frontal position in the longitudinal direction, a front end of the movable rail forwardly protrudes from a front end of the stationary rail, while in a case where the seat cushion is to be positioned to be the most rearward position in the longitudinal direction, a rear end of the movable rail rearwardly protrudes from a rear end of the stationary rail. The slide structure includes a leg which is fixed on the vehicle floor for fixing and thus supporting an end portion of the stationary rail.

According to the above slide structure, the seat cushion, and thus, the seat of the vehicle can be positioned in the longitudinal direction by sliding the movable rail fixed on the seat cushion in the longitudinal direction relative to the stationary rail fitting with the movable rail and fixed on the floor of the vehicle through the leg.

In such a case, grease is normally applied to a sliding portion between the movable and the stationary rails in such a way that the movable rail can smoothly slide in the longitudinal direction relative to the stationary rail since the movable rail fits with the stationary rail with opening portions formed by the respective C-shaped cross-sections facing each other in such a way that, in a case where the seat cushion is to be positioned to be the most frontal position in the longitudinal direction, a front end of the movable rail forwardly protrudes from a front end of the stationary rail, while, in a case where the seat cushion is to be positioned to be the most rearward position in the longitudinal direction, a rear end of the movable rail rearwardly protrudes from a rear end of the stationary rail, an aesthetic external appearance of the vehicle seat is deteriorated due to the fact that such grease applied portion is exhibited outside, and in a case where the seat cushion is moved in the longitudinal direction by inserting a hand of a passenger below the seat cushion, grease can adhere to the hand to smear it. In addition, when the movable rail is moved while the hand touches the sliding portion between the movable and stationary rails, a passenger can be inadvertently injured.

SUMMARY OF THE INVENTION

In view of the above technical problems, an object of the present invention is to provide a slide structure of a vehicle seat which is capable of maintaining an aesthetic external appearance and a safety of the vehicle seat.

In view of the above technical problems, according to an aspect of the invention, there is provided a slide structure of a vehicle seat which positions a seat cushion in a longitudinal direction of a vehicle comprises a stationary outer rail which extends in the longitudinal direction of the vehicle and is fixed on a vehicle floor and includes a substantially C-shaped cross-section an opening portion of which is oriented inwardly in the widthwise direction of the vehicle and is disposed to exhibit an elongated cross-section in the vertical direction of the vehicle, and a movable inner rail which extends in the longitudinal direction of the vehicle and fits over said stationary outer rail so as to be slidable in the longitudinal direction of the vehicle relative to said stationary outer rail and is fixed on the seat cushion and includes a substantially C-shaped cross-section, an opening portion of which is oriented outwardly in the widthwise direction of the vehicle and is disposed to exhibit an elongated cross-section in the vertical direction of the vehicle, said movable inner rail fits with said stationary outer rail with the opening portions formed by the respective substantially C-shaped cross-sections facing each other in such a way that, in a case where said seat cushion is positioned to be the most front position, a front end of said movable inner rail protrudes forwardly from a front end of said stationary outer rail, while, in a case where said seat cushion is positioned to be the most rearward position, a rear end of said movable inner rail protrudes rearwardly from a rear end of said stationary outer rail, said slide structure further comprises a slide cover which is provided on an end portion of the stationary outer rail and includes a substantially C-shaped cross-section, said slide cover fits over said movable inner rail in the longitudinal direction with its opening portion formed by the substantially C-shaped cross-section being oriented outwardly in the widthwise direction and includes an end face whose inner surface contacts an end of said stationary outer rail, the longitudinal length of said slide cover is set to be longer than a distance from said end of said stationary outer rail on which said slide cover is provided to an end of said movable inner rail when said movable inner rail reaches a position where said end of said movable inner rail at the side of said end of said stationary outer rail is situated to be the farthest from said end of said stationary outer rail, said slide structure further comprises a means for biasing said slide cover toward said stationary outer rail, one end of which is fixed on said slide cover.

According to the above slide structure of the vehicle seat, the seat cushion, and thus, the vehicle seat can be positioned at a desired position in the longitudinal direction of the vehicle by sliding the movable inner rail fixed on the seat cushion relative to the stationary outer rail fitting into the movable inner rail and fixed on the vehicle floor, in the longitudinal direction.

In such a case, grease is normally applied to a sliding portion between the movable inner rail and the stationary outer rail in such a way that the movable inner rail can smoothly slide in the longitudinal direction relative to the stationary outer rail. Since the movable inner rail fits over the stationary outer rail with the opening portions formed by the respective substantially C-shaped cross-sections facing each other in such a way that, in a case where the seat cushion is positioned to be the most frontal position in the longitudinal direction, the front end of the movable inner rail protrudes forwardly from the front end of the stationary outer rail, while, in a case where the seat cushion is positioned to be the most rearward position in the longitudinal direction, the rear end of the movable inner rail protrudes rearwardly from the rear end of the stationary outer rail, an aesthetic external appearance of the slide structure can get worse due to the fact that such grease applied portion is exhibited outside and, in a case where the seat cushion is moved in the longitudinal direction by inserting a hand of a passenger below the seat cushion, grease can adhere to the hand to smear it. In addition, the passenger can be inadvertently injured when the movable inner rail is moved while the hand touches the sliding portion between the movable inner rail and the stationary outer rail.

However, since the slide cover which includes the substantially C-shaped cross-section and fits over the movable inner rail in the longitudinal direction with its opening portion formed by the C-shaped cross-section being oriented outwardly in the widthwise direction is provided on the end portion of the stationary outer rail, the slide cover can cover the sliding portion to which grease is applied so as not to be seen from the outside, and the hand of the passenger can be kept away from the sliding portion by the slide cover, even when the hand is inserted below the seat cushion, so that the aesthetic external appearance and the safety of the vehicle seat can be secured.

For instance, in a case where the slide cover is provided on the front end portion of the stationary outer rail and the seat cushion is positioned to be the most frontal position, when the movable inner rail is moved forwardly relative to the stationary outer rail, the front end of the movable inner rail contacts the inner surface of the end face of the stationary outer rail, the slide cover is moved forwardly along with the movable inner rail being guided along the movable inner rail.

On the other hand, in a case where the seat cushion is moved rearwardly from the most frontal position, since the slide cover is biased toward the stationary outer rail by the biasing means whose one end is fixed on the slide cover, the slide cover can be moved rearwardly, independent of the rearward movement of the movable inner rail. Even when the front end of the movable inner rail is located to be rearwardly retracted from the front end of the stationary outer rail, the slide cover can be kept moving to the front end portion of the stationary outer rail due to such a biasing force to always cover the end portion of the stationary outer rail. In this case, since the longitudinal length of the slide cover is set to be longer than a distance between the front end of the stationary outer rail and the front end of the movable inner rail when the movable inner rail reaches the most rear position, the fitting relationship between the slide cover and the movable inner rail can be maintained, so that the slide cover can be prevented from slipping off the movable inner rail.

In another embodiment of the present invention, said slide structure further comprises a leg which is fixed on a floor of the vehicle and fixes and thus supports said end portion of said stationary outer rail, said leg comprises a substantially L-shaped cross-section and one plain portion of which forms a surface to be fixed on the vehicle floor, while the other plain portion of which is oriented in the substantially vertical direction and includes a supporting portion for supporting a side surface of said stationary outer rail from outside in the widthwise direction.

According to the above slide structure of the vehicle seat, in a case where the slide cover is provided on the front end portion of the stationary outer rail and the seat cushion is positioned to be the most frontal position, when the movable inner rail is moved forwardly relative to the stationary outer rail, based on the fact that the leg includes a substantially L-shaped cross-section and one of the plain portions forms a surface to be fixed on the floor of the vehicle, while the supporting portion for supporting the side surface of the stationary outer rail from outside in the widthwise direction is provided on the other thereof, since the opening portion extending in the longitudinal direction of the C-shaped cross-section of the slide cover is oriented outwardly in the widthwise direction, the slide cover can smoothly move in the longitudinal direction due to the fact that the opening portion of the slide cover can avoid colliding with the supporting portion of the leg, in a case where the slide cover is moved forwardly along with the movable inner rail relative to the stationary outer rail.

In another embodiment of the present invention, said leg includes a front leg for fixing and supporting said front portion of said stationary outer rail and a rear leg for fixing and supporting said rear portion of the stationary outer rail, said front and rear legs are spaced apart from each other in the longitudinal direction, first and second slide covers are provided on the front and rear ends of the stationary outer rail, respectively, the first slide cover provided on the front end portion of the stationary outer rail includes an end face an inner surface of which contacts a front end of the stationary outer rail, the second slide cover provided on the rear end portion of the stationary outer rail includes an end face an inner surface of which contacts a rear end of the stationary outer rail, one end and the other end of said biasing means are connected to said first and second slide covers, respectively, a supporting portion of said front leg includes a rivet connecting a side surface of the stationary outer rail and the other of the plain portions of the front leg through a spacer, a supporting portion of said rear leg includes a rivet connecting the side surface of the stationary outer rail and the other of the plain portions of the rear leg through a spacer, said slide structure of the vehicle seat further comprises a reinforcing plate which is applied to said side surface of the stationary outer rail from outside in the widthwise direction along the longitudinal direction.

In another embodiment of the present invention, said stationary outer rail comprises a stationary side surface oriented vertically, a stationary protruding upper surface protruding inwardly in the widthwise direction from an upper edge of said stationary side surface, and a stationary protruding lower surface protruding inwardly in the widthwise direction from a lower edge of said stationary side surface, said movable inner rail comprises a movable side surface oriented vertically, a movable protruding upper surface protruding outwardly in the widthwise direction from an upper edge of said movable side surface, and a movable protruding lower surface protruding outwardly in the widthwise direction from a lower edge of said movable side surface, and said slide cover comprises a slide side surface oriented vertically, for covering said movable side surface, a slide protruding upper surface protruding outwardly in the widthwise direction from an upper edge of said slide side surface for covering said movable protruding upper surface, and a slide protruding lower surface protruding outwardly in the widthwise direction from a lower edge of said slide side surface for covering said movable protruding lower surface.

In another embodiment of the present invention, said slide cover includes at its slide side surface a cut-off portion extending in the longitudinal direction, and the vertical width of the cut-off portion is set so as not to contact a link pin of a front link.

In another embodiment of the present invention, said biasing means is made of an elongated rubber and is disposed to be along said slide protruding upper surface or said slide protruding lower surface.

In view of the above technical problems, according to an aspect of the invention, there is provided a slide structure of a vehicle seat which positions a seat cushion in a longitudinal direction of a vehicle comprises a stationary inner rail which extends in the longitudinal direction of the vehicle and includes a substantially C-shaped cross-section and is disposed to exhibit an elongated cross-section in the vertical direction of the vehicle, and a movable outer rail which extends in the longitudinal direction of the vehicle and fits with said stationary inner rail so as to be slidable in the longitudinal direction of the vehicle relative to said stationary inner rail and is fixed on the seat cushion and includes a substantially C-shaped cross-section and is disposed to exhibit an elongated cross-section in the vertical direction of the vehicle, said movable outer rail fits into said stationary inner rail with the opening portions formed by the respective substantially C-shaped cross-sections facing each other in such a way that, in a case where said seat cushion is positioned to be the most frontal position, a front end of said movable outer rail protrudes forwardly from a front end of said stationary inner rail, while, in a case where said seat cushion is positioned to be the most rearward position, a rear end of said movable outer rail protrudes rearwardly from a rear end of said stationary inner rail, said slide structure further comprises a slide cover which is provided on an end portion of the stationary inner rail, said slide cover extends in the longitudinal direction so as to cover said stationary inner rail from above and includes an end face whose inner surface contacts an end of said stationary inner rail, said slide structure further comprises a means for biasing said slide cover toward said stationary inner rail, one end of which is fixed on said slide cover.

According to the above slide structure of the vehicle seat, the seat cushion, and thus, the vehicle seat can be positioned at a desired position in the longitudinal direction of the vehicle by sliding the movable outer rail fixed on the seat cushion relative to the stationary inner rail fitting over the movable outer rail and fixed on the vehicle floor, in the longitudinal direction.

In such a case, grease is normally applied to a sliding portion between the movable outer rail and the stationary inner rail in such a way that the movable outer rail can smoothly slide in the longitudinal direction relative to the stationary inner rail. Since the movable outer rail fits into the stationary inner rail with the opening portions formed by the respective substantially C-shaped cross-sections facing each other in such a way that, in a case where the seat cushion is positioned to be the most frontal position in the longitudinal direction, the front end of the movable outer rail protrudes forwardly from the front end of the stationary inner rail while, in a case where the seat cushion is positioned to be the most rearward position in the longitudinal direction, the rear end of the movable outer rail protrudes rearwardly from the rear end of the stationary inner rail, an aesthetic external appearance of the slide structure can get worse due to the fact that such grease applied portion is exhibited outside and, in a case where the seat cushion is moved in the longitudinal direction by inserting a hand of a passenger below the seat cushion, grease can adhere to the hand to smear it. In addition, the passenger can be inadvertently injured when the movable outer rail is moved while the hand touches the sliding portion between the movable outer rail and the stationary inner rail.

In such a case, since the slide cover extending in the longitudinal direction is provided on the end portion of the stationary inner rail so as to cover the stationary inner rail from above, the sliding portion to which grease is applied can be covered so as not to be seen from outside, while a hand of a passenger can be kept away from the sliding portion, even if the hand is inserted below the seat cushion, whereby the slide structure of the seat cushion which is capable of maintaining the aesthetic external appearance and the safety of the vehicle seat can be provided.

For instance, in a case where the seat cushion is positioned to be the most frontal position, when the movable outer rail is moved forwardly relative to the stationary inner rail, the front end of the movable outer rail contacts the inner surface of the end face of the slide cover, the slide cover is forwardly moved along with the movable outer rail.

On the other hand, in a case where the seat cushion is moved rearwardly from the most frontal position, since the slide cover is biased toward the stationary inner rail by the biasing means whose one end is fixed on the slide cover, the slide cover can be moved rearwardly, independent of the rearward movement of the movable outer rail. Even when the front end of the movable outer rail is located to be rearwardly retracted from the front end of the stationary inner rail, the slide cover can be kept moving to the front end portion of the stationary inner rail due to such a biasing force to always cover the end portion of the stationary inner rail. In this connection, the above is also applied to a case where the seat cushion positioned to be the most rearward position is moved forwardly from the most rearward position.

In another embodiment of the present invention, said slide structure further comprises a leg which extends in the longitudinal direction and is fixed on a floor of the vehicle and fixes and thus supports said end portion of said stationary inner rail, said leg comprises a substantially L-shaped cross-section and one plain portion of which forms a surface to be fixed on the vehicle floor, while the other plain portion of which is oriented in the substantially vertical direction and includes at its upper edge an inwardly and horizontally protruding flange portion which fixes and thus supports said stationary inner rail at its lower surface, a space through which said movable outer rail passes is formed below said flange portion, said slide cover extends in the longitudinal direction so as to cover said stationary inner rail and said leg from above, a resting potion which rests on said leg and a guided portion which is guided in the longitudinal direction along said leg are provided on said slide cover.

According to the above slide structure of the vehicle seat, in a case where the seat cushion is positioned to be the most frontal position, when the movable outer rail is moved forwardly relative to the stationary inner rail, the slide cover is forwardly moved along with the movable outer rail, while it is kept being rested on the leg through the resting portion, while at the same time it is guided along the leg through the guided portion.

In such a case, since the leg includes a substantially L-shaped cross-section and one of its plain portions forms a surface to be fixed on the floor of the vehicle, while the other thereof is oriented to be substantially vertical and the flange portion protruding horizontally toward the inside of the vehicle and supporting the stationary inner rail at its lower surface is provided on the upper edge of the other thereof, and a space through which the movable outer rail passes is formed below the flange portion, in a case where the movable outer rail interposed between the leg and the stationary inner rail is moved in the longitudinal direction, the space through which the movable outer rail passes can be secured, while at the same time the leg fixes and thus supports the stationary inner rail from outside above.

According to the slide structure of the vehicle seat of the present invention, since the slide cover with a substantially C-shaped cross-section is provided on the end portion of the stationary outer rail so as to fit over the movable inner rail with the opening portion of the C-shaped cross-section being oriented outwardly in the widthwise direction, the sliding portion between the movable inner rail and the stationary outer rail to which grease is applied can be covered so as not to be seen from outside, while at the same time a hand of a passenger can be kept away from the sliding portion even when the hand is inserted blow the seat cushion, whereby the slide structure of the cushion seat which is capable of maintaining the aesthetic external appearance and the safety of the vehicle seat can be provided.

DETAILED DESCRIPTION OF EMBODIMENTS OF THE INVENTION

The first embodiment of the slide structure of the present invention will be described in detail with reference to the drawings as an example.

Figure 1:
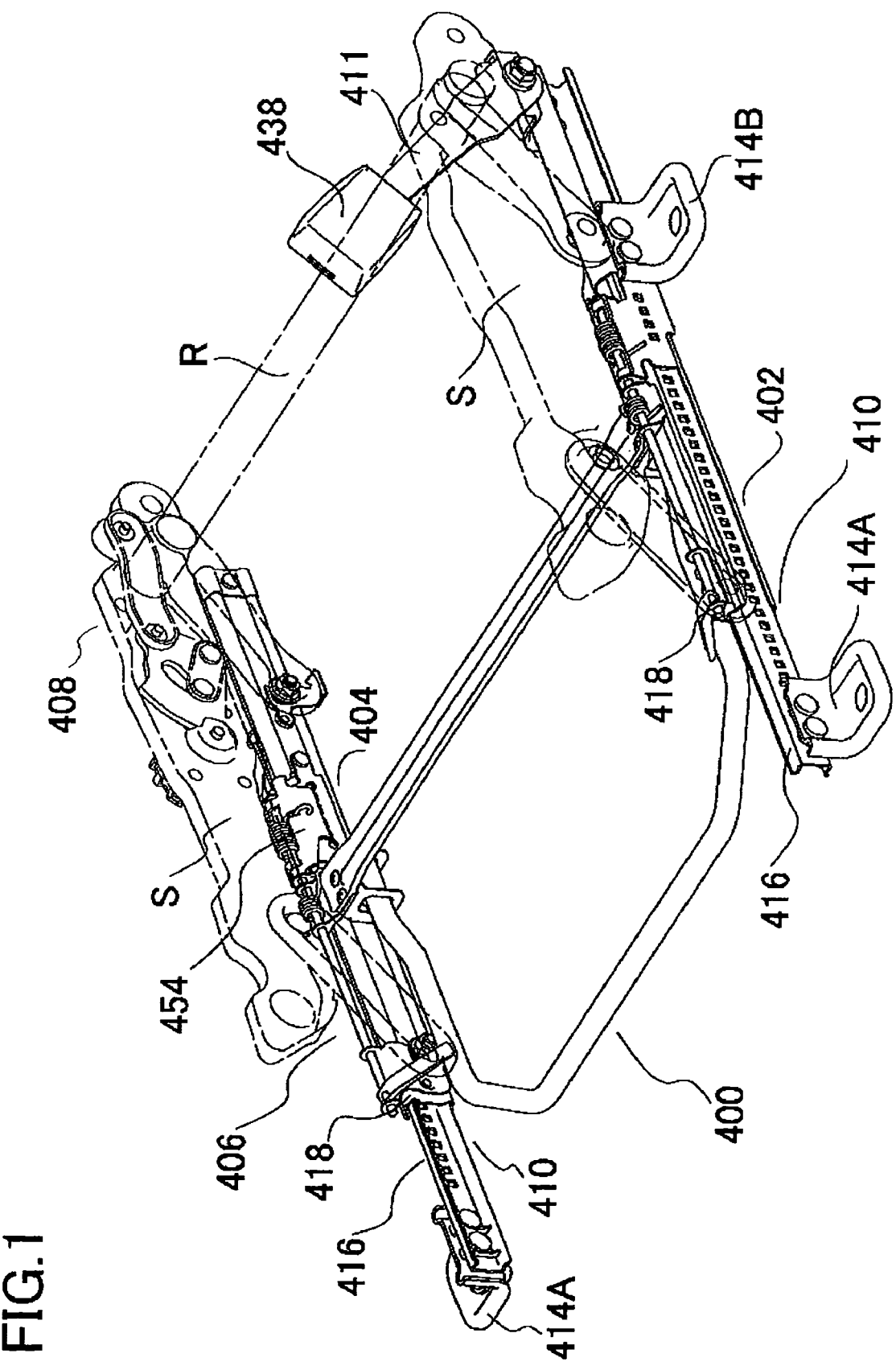
FIG. 1 is a perspective view showing a slide structure of a vehicle seat of the first embodiment of the present invention.

As shown in FIG. 1, a slide structure 400 of the vehicle seat generally comprises a mechanism 402 for adjusting the longitudinal position of the vehicle seat, a mechanism 404 for positioning the vehicle seat in the longitudinal direction, a mechanism 406 for adjusting the vertical position of the vehicle seat, and a mechanism 408 for positioning the vehicle seat in the vertical direction.

The vehicle seat comprises a pair of side frames S each extending in the longitudinal direction of the vehicle, front and rear pipes F, R each connecting the pair of side frames, a seat cushion C fixed on the vehicle (not shown), and a seat back (not shown) mounted on the seat cushion C via a recliner (not shown) so as to be reclined relative to the seat cushion C. Since the slide structure 400 of the vehicle seat is provided on the side frame S of the seat cushion C, the entire vehicle seat including the seat back can be adjustably positioned by the fact that the longitudinal and vertical position of the seat cushion C can be adjusted and positioned.

The mechanism 402 for adjusting the longitudinal position of the vehicle seat generally comprises a pair of rail structures 410 spaced apart from each other in the widthwise direction of the vehicle and a retainer 412 (refer to FIG. 4) for moving the rails in the longitudinal direction in a sliding manner.

As shown in FIG. 1, since the slide structure 400 of the vehicle seat is configured in a symmetrical manner with respect to a central line in the longitudinal direction except for the fact that a belt bracket 411 including a belt buckle 438 into which a passenger belt fits is provided on the one of the pair of the rail structures 410, one of the pair of the rail structures 410 will be explained about, and as to the other thereof, the reference numbers same as those attached to the elements in the one thereof are attached to the same elements, and the explanation about—the other thereof is omitted instead.

Each of the pair of the rail structures 410 is made of steel and comprises a stationary outer rail 416 fixed on a vehicle floor and extending in the longitudinal direction, and a movable inner rail 418 fixed on a seat cushion C and extending in the longitudinal direction. One end of the stationary outer rail 416 is supported by a leg 414A, while the other end thereof is supported by a leg 414 B. The legs 414A,B are spaced apart from each other in the longitudinal direction and each leg serves as a bracket for mounting the stationary outer rail 416, while the movable inner rail 418 fits over the stationary outer rail 416. In view of a space of the floor on the front side on which the slide structure 400 of the vehicle seat is disposed, the length of each of the movable inner rail 418 and the stationary outer rail 416 may be appropriately determined taking into consideration a situation in which the movable inner rail 418 is disposed to be the most rearward position and the most frontal position of the vehicle relative to the stationary outer rail 416.

Figure 2:
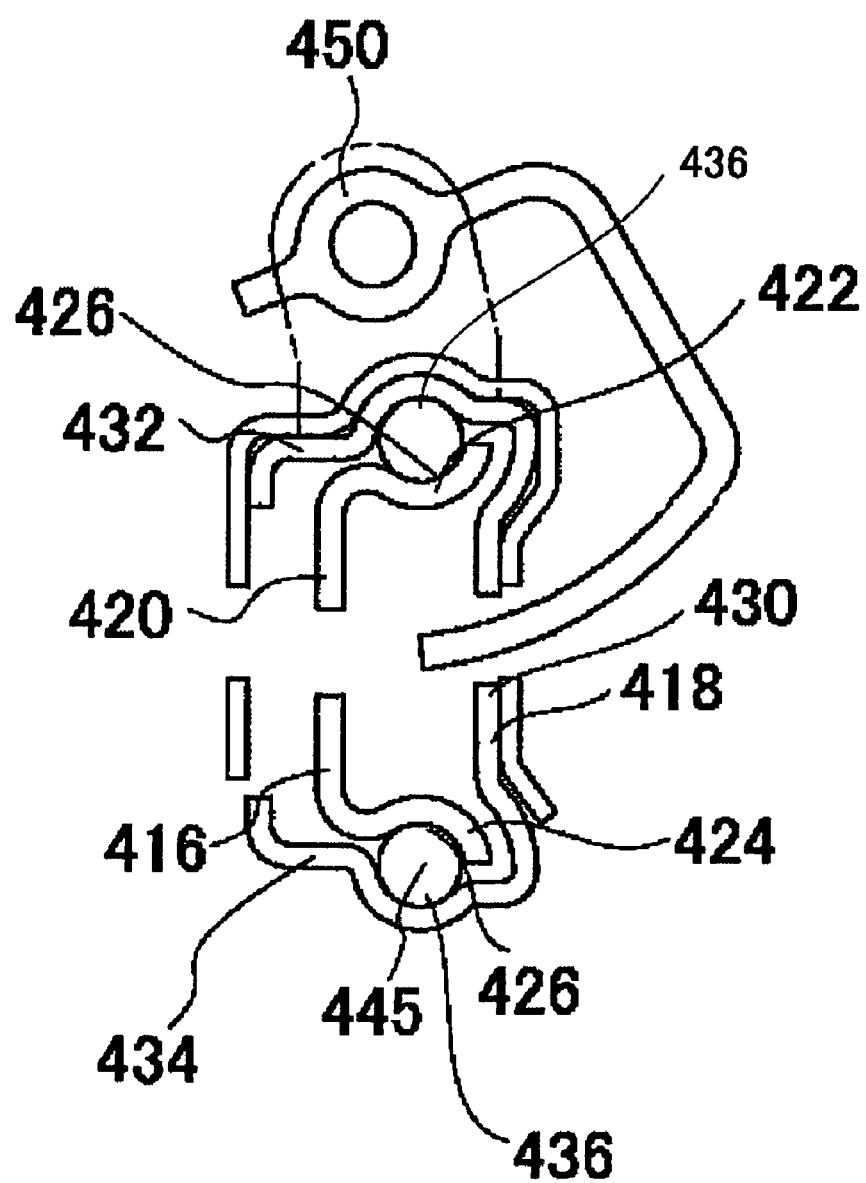
FIG. 2 is a general cross-sectional view showing a situation in which a movable inner rail is disengaged from a stationary outer rail in the slide structure of a vehicle seat of the first embodiment of the present invention.
Figure 3:
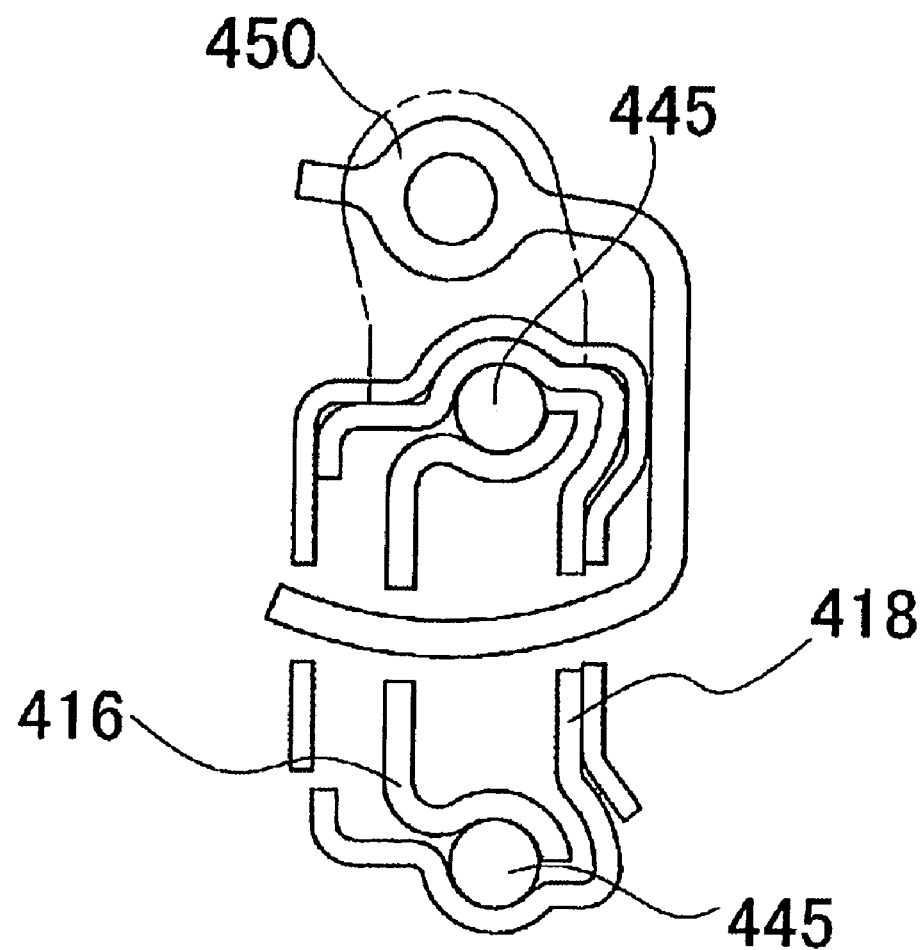
FIG. 3 is a general cross-sectional view showing a situation in which a movable inner rail is engaged by a stationary outer rail in the slide structure of a vehicle seat of the first embodiment of the present invention.

As shown in FIGS. 2 and 3 (in both Figs., the left side in the figure means the outside of the vehicle in the widthwise direction), the stationary outer rail 416 includes a stationary side surface 420 extending in the longitudinal direction along the vertical direction, a first protruding stationary upper surface 422 laterally protruding from one of the side edges of the stationary side surface 420, and a second protruding stationary lower surface 424 laterally protruding from the other of the side edges of the stationary side surface 420 to form a substantially C-shaped cross-section. Each of the first protruding stationary upper surface 422 and the second protruding stationary lower surface 424 includes at its outer surface a second arcuate cross-sectional groove 426 extending in the longitudinal direction. The second arcuate cross-sectional groove 426 cooperates with a first arcuate cross-sectional groove 436 provided on the movable inner rail 418 (which is explained about below) to form a guide groove for guiding a ball. Accordingly, a shape of the arcuate cross-section of each of the above grooves may be determined in view of the above aspect.

Figure 4:
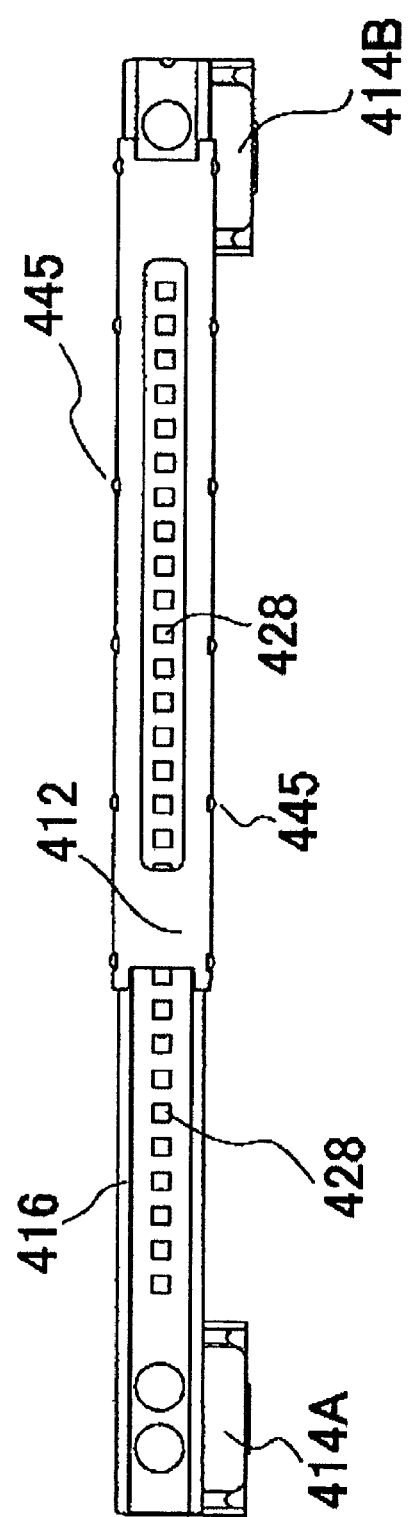
FIG. 4 is a general side view showing a situation in which a retainer is mounted on a stationary outer rail in the slide structure of a vehicle seat of the first embodiment of the present invention.

As shown in FIG. 4, a plurality of stationary locking holes 428 spaced apart from each other in the longitudinal direction with a predetermined distance are provided on the stationary outer rail 416. The number of the stationary locking holes 428 may be appropriately determined in view of a range in which the movable inner rail 418 moves in the longitudinal direction relative to the stationary outer rail 416.

On the other hand, as shown in FIGS. 2 and 3, the movable inner rail 418 fits over the stationary outer rail 416 with opening portions formed by the respective C-shaped cross-sections facing each other. The movable inner rail 418 includes a movable side surface 430 extending in the longitudinal direction along the vertical direction, a first protruding stationary upper surface 432 laterally protruding from one of side edges of the movable side surface 430, and a second protruding stationary lower surface 434 laterally protruding from the other of side edges of the movable side surface 430 to form 4 substantially C-shaped cross-section. Each of the first protruding movable upper surface 432 and the second protruding movable lower surface 434 includes at its inner surface the first arcuate cross-sectional groove 436 extending in the longitudinal direction.

Figure 5:
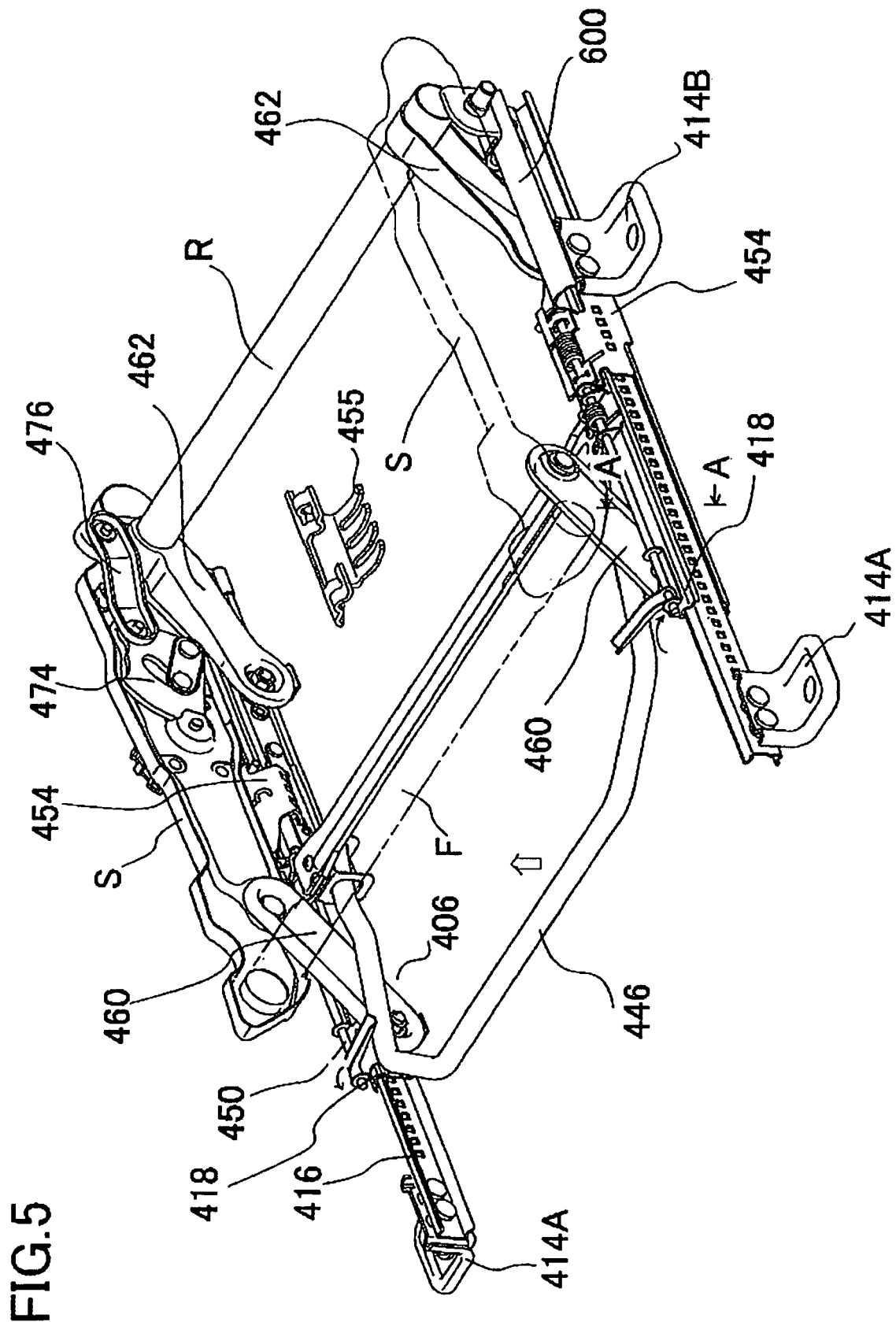
FIG. 5 is a view showing a situation in which the longitudinal position of the vehicle seat is adjusted by the slide structure of a vehicle seat of the first embodiment of the present invention.
Figure 8:
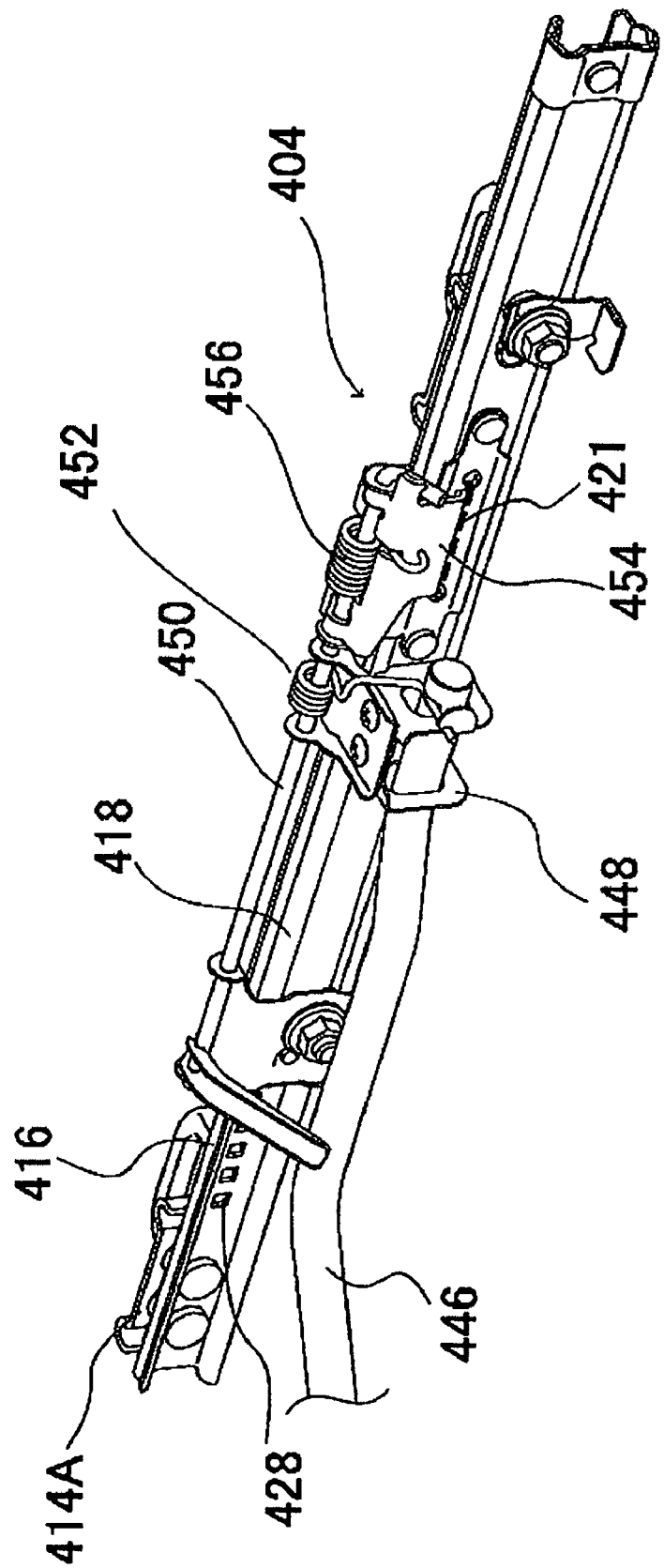
FIG. 8 is a partial enlarged view showing one of the rails in the slide structure of a vehicle seat of the first embodiment of the present invention.

As shown in FIG. 5, the movable inner rail 418 is fixed on the corresponding side frame S of the seat cushion through a parallel link mechanism of the mechanism 406 for adjusting the vertical position of the seat cushion described below. In the pair of the rail structures 401, as described above, the belt buckle 438 is fixed on the rear side end portion of one of the movable inner rail 418 (refer to FIG. 1). A plurality of movable locking holes 421 (refer to FIG. 8) are provided on the movable inner rail 418 with being spaced apart from each other with the same distance as that of the adjacent stationary locking holes 428 in the longitudinal direction. In FIG. 8, four movable locking holes 421 are provided in view of the relationship between a locking plate 454 (described later) and the movable locking holes 421. However, the number of the movable locking holes 421 is not limited to four, but less than four may be adopted so long as the movable inner rail 418 can be reliably locked against the stationary outer rail 416.

Figure 6:
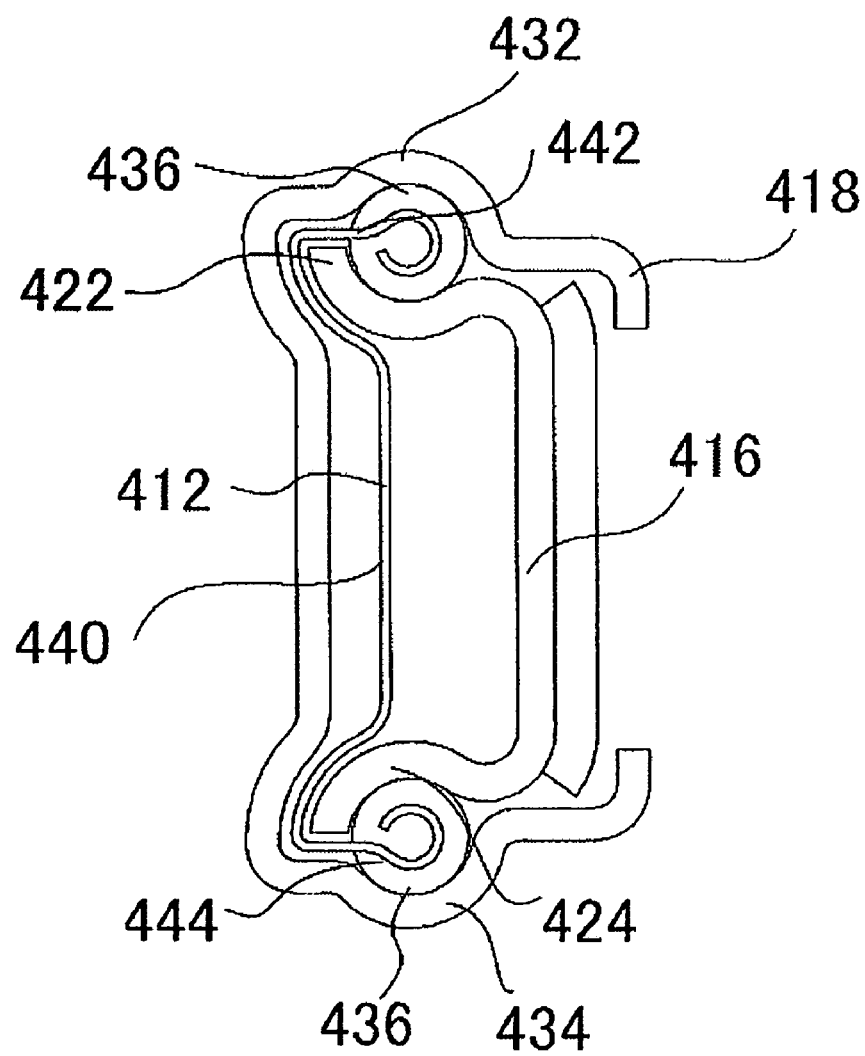
FIG. 6 is a cross-sectional view taken along a line A-A in FIG. 5.
Figure 7:
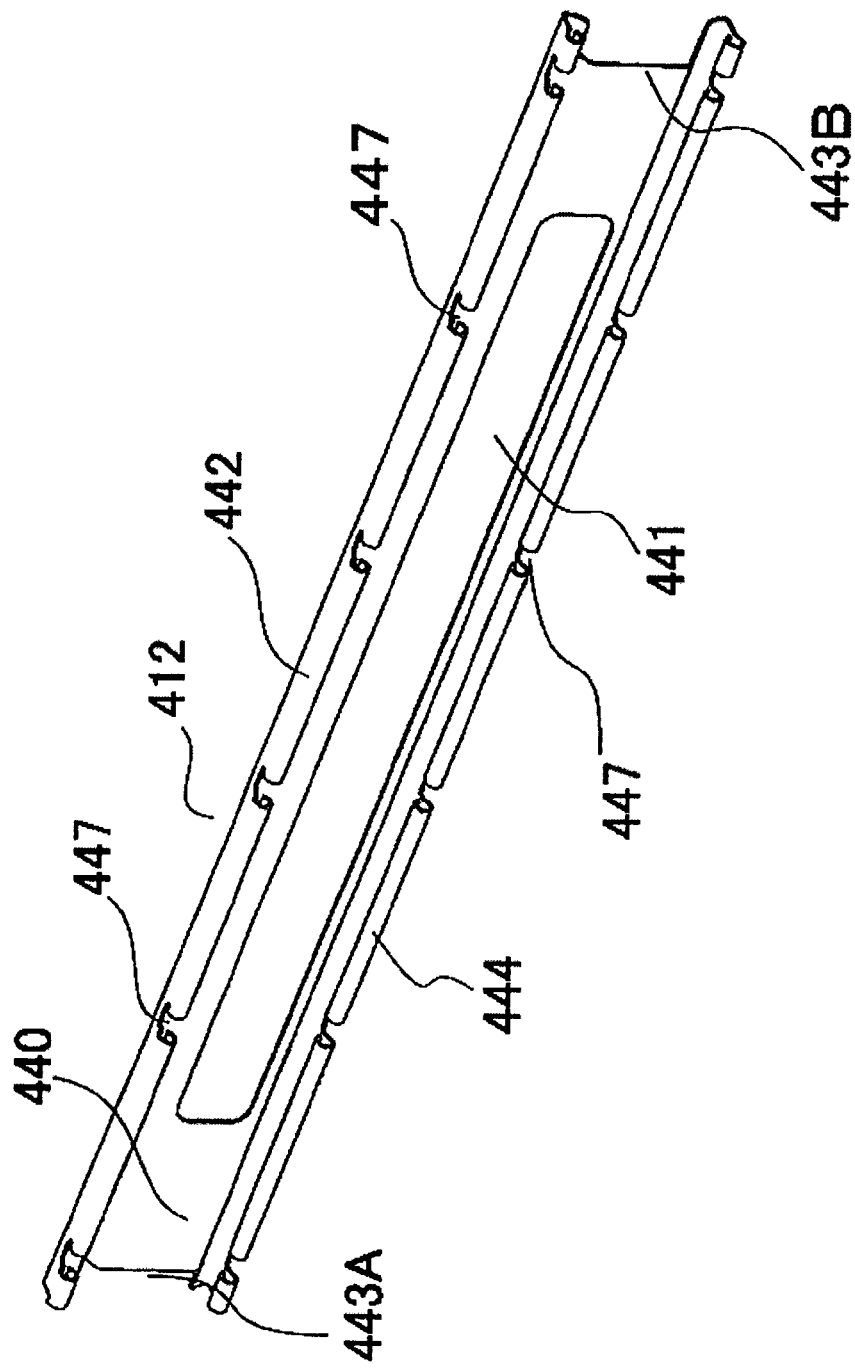
FIG. 7 is a perspective view showing a retainer in the slide structure of a vehicle seat of the first embodiment of the present invention.

As to a retainer 412, as shown in FIG. 6 (in this figure, the left side indicates the inside of the vehicle in the widthwise direction), the retainer 412 extending in the longitudinal direction is provided between the stationary outer rail 416 and the movable inner rail 418. As shown in FIG. 7, the retainer 412 includes a retainer side surface 440 extending in the longitudinal direction along the vertical direction, a plurality of first protruding stationary upper surfaces 442 which are spaced apart from each other in the longitudinal direction and each of which laterally protrudes from one of side edges of the retainer side surface 440, and a plurality of second protruding stationary lower surfaces 444 which are spaced apart from each other in the longitudinal direction and each of which laterally protrudes from the other of side edges of the retainer side surface 440. More specifically, as shown in FIG. 6, a concave portion which extends in the longitudinal direction and is dented toward an inner surface of the stationary outer rail 416 is provided on the retainer side surface 440, which forms an M-shaped cross-section. This allows for the retainer 412 to move in the longitudinal direction while it is guided by the first protruding stationary upper surface 422 and the second protruding stationary lower surface 424 of the stationary outer rail 416, and yet its side surface is kept disengaged from the movable inner rail 418.

As shown in FIG. 7, an elongated opening 441 extending in the longitudinal direction is provided on the retainer side surface 440 of the retainer 412. The elongated opening 441 includes a front end edge 443A and a rear end edge 443B. The longitudinal length of the elongated opening 441 may be appropriately determined in view of the fact that the strength of the retainer 412 is sufficiently secured and yet the weight thereof is decreased.

As shown in FIG. 6, the retainer 412 is positioned relative to the stationary outer rail 416 with the opening portions formed by the respective C-shaped cross-sections facing each other and the plurality of first retainer protruding upper surfaces 442 being interposed between the first protruding movable upper surface 432 and the first protruding stationary upper surface 422, while the plurality of second retainer protruding lower surfaces 444 being interposed between the second protruding movable lower surface 434 and the second protruding stationary lower surface 424.

As shown in FIG. 7, each of the plurality of the first retainer protruding upper surfaces 442 and the plurality of second retainer protruding lower surfaces 444 includes perforated holes 447 each retaining a ball 445. This causes the ball 445 to roll between the first protruding movable upper surface 432 and the first protruding stationary upper surface 422 and between the second protruding movable lower surface 434 and the second protruding stationary lower surface 424, whereby the movable inner rail 418 along with the retainer 412 can be moved in the longitudinal direction relative to the stationary outer rail 416.

As stated above, the movable side surface 430, the stationary side surface 420 and the retainer side surface 440 are all oriented in the vertical direction, whereby each of the movable outer rail 416 and the stationary inner rail 418 is disposed so as to form an elongated cross-section in the vertical direction. This allows for the section modulus of each of the two rails to be effectively secured with respect to a bending moment about a neutral line in the widthwise direction in its vertical cross-section, as compared with the rails with the elongated cross-section in the horizontal direction.

Next, as shown in FIGS. 5 and 8, the mechanism 404 for positioning the seat cushion in the longitudinal direction generally comprises an actuation lever 446, a bracket 448 for supporting the actuation lever 446, a release rod 450, a spring 452 for locking the actuation lever, a locking plate 454 including locking teeth 455 (refer to FIG. 5), and a return spring 456 for the locking plate. The number of the locking teeth 455 is set to be the same as is that of the movable locking holes 421 and the distance between the adjacent teeth is set to be the same as that of the adjacent movable locking holes 421, whereby the locking teeth 455 can penetrate into the movable locking holes 421 and the stationary locking holes 428.

The release rod 450 is rotated about the longitudinal direction of the rail toward the outside of the rail (a direction an arrow indicates in FIG. 5) by raising the actuation lever 446 against the biasing force generated by the spring 452 for locking the actuation lever, whereby the locking plate 454 mounted on the release rod 450 is rotated against the biasing force generated by the return spring 456 for the locking plate from a locking position to a lock releasing position. This allows for the locking teeth 455 having penetrated into the movable locking holes 421 and the stationary locking holes 428 to disengage from both holes, whereby the movable inner rail 418 can freely move in the longitudinal direction relative to the stationary outer rail 416 (refer to FIG. 2).

After the movable inner rail 418 is moved in the longitudinal direction to a target position, the actuation lever 446 having been raised is released at this position. This causes the actuation lever 446 to be lowered by the spring 452 for locking the actuation lever, whereby the release rod 450 is rotated toward the inside of the rail (contrary to a direction an arrow indicates in FIG. 5), while the locking plate 454 is rotated from the locking releasing position to the locking position by the biasing force generated by the return spring 456 for the locking plate. This causes the seat cushion to be positioned on a new position in the longitudinal direction (refer to FIG. 3).

Figure 9:
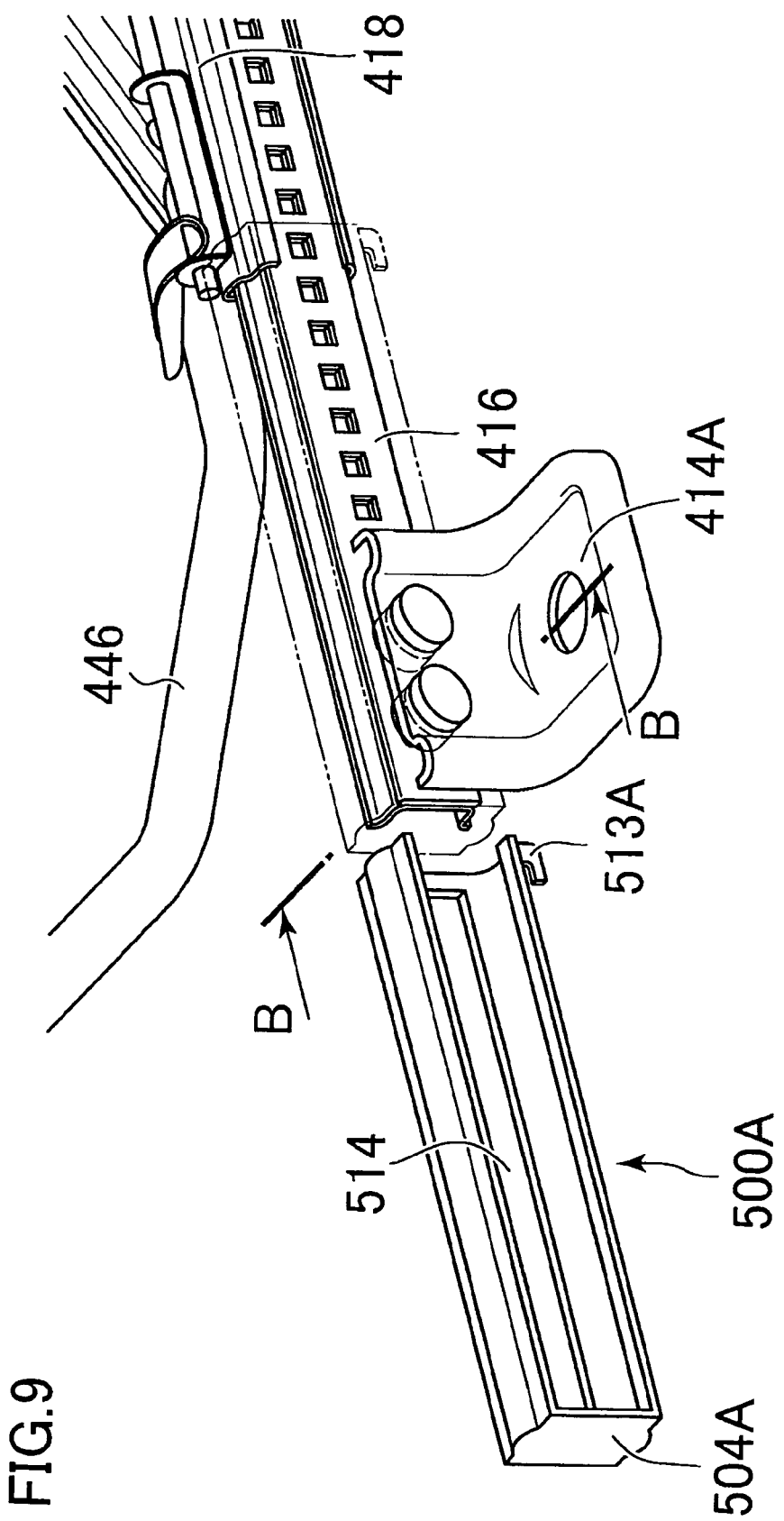
FIG. 9 is a partial perspective view showing a method by which a slide cover at the front side of the vehicle is mounted in the slide structure of a vehicle seat of the first embodiment of the present invention.
Figure 10:
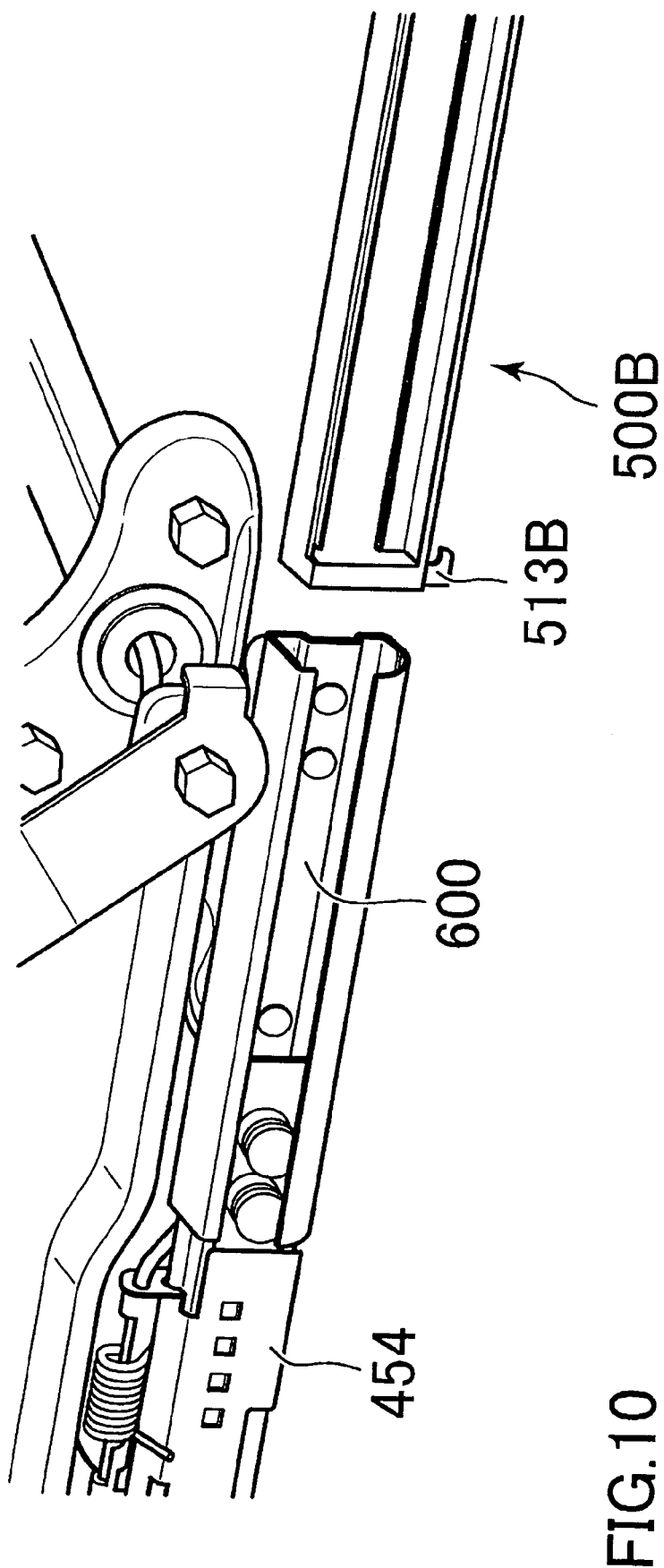
FIG. 10 is a partial perspective view showing a method by which a slide cover at the rear side of the vehicle is mounted in the slide structure of a vehicle seat of the first embodiment of the present invention.

Next, explaining about the slide cover 500, as shown in FIG. 9, the slide cover 500A is provided on the front end portion of the stationary outer rail 416, while as shown in FIG. 10, the slide cover 500B is provided on the rear end portion of the stationary outer rail 416. Accordingly, the aesthetic external appearance and the safety of the vehicle seat can be maintained by not exhibiting the sliding portion between the stationary outer rail 416 and the movable inner rail 418 outside, while keeping a hand of a passenger away from the sliding portion.

In this connection, as to the slide cover 500B, more specifically, in a case where the belt load is exerted on the movable inner rail 418 when the movable inner rail 418 is positioned to be the most rearward position in the longitudinal direction to overhang the stationary outer rail 416, in view of the fact that the first arcuate cross-sectional groove 436 and the second arcuate cross-sectional groove 426, both constituting the guide groove for the ball, are flattened, so that the ball 445 slips off from the guide groove, a reinforcing bracket 600 with a substantially C-shaped cross-section is provided on the rear end portion of the movable inner rail 418 so that the reinforcing bracket 600 is applied to the guiding groove for the ball 445 from outside so as to be closely attached thereto, while the slide cover 500B fits over the reinforcing bracket 600, in order to prevent the slipping of the ball 445 from the guide groove.

Since the structures of the slide covers 500A,B provided on each end portion of the stationary outer rail 416 are almost the same, only the slide cover 500A provided on the front end portion of the stationary outer rail 416 will be explained about in detain below.

The slide cover 500A is preferably made of resin in view of the decrease of its weight, and includes a substantially C-shaped cross-section, so that it fits over the movable inner rail 418 along the longitudinal direction with the opening portion formed by its substantially C-shaped cross-section facing outwardly in the widthwise direction.

Figure 11:
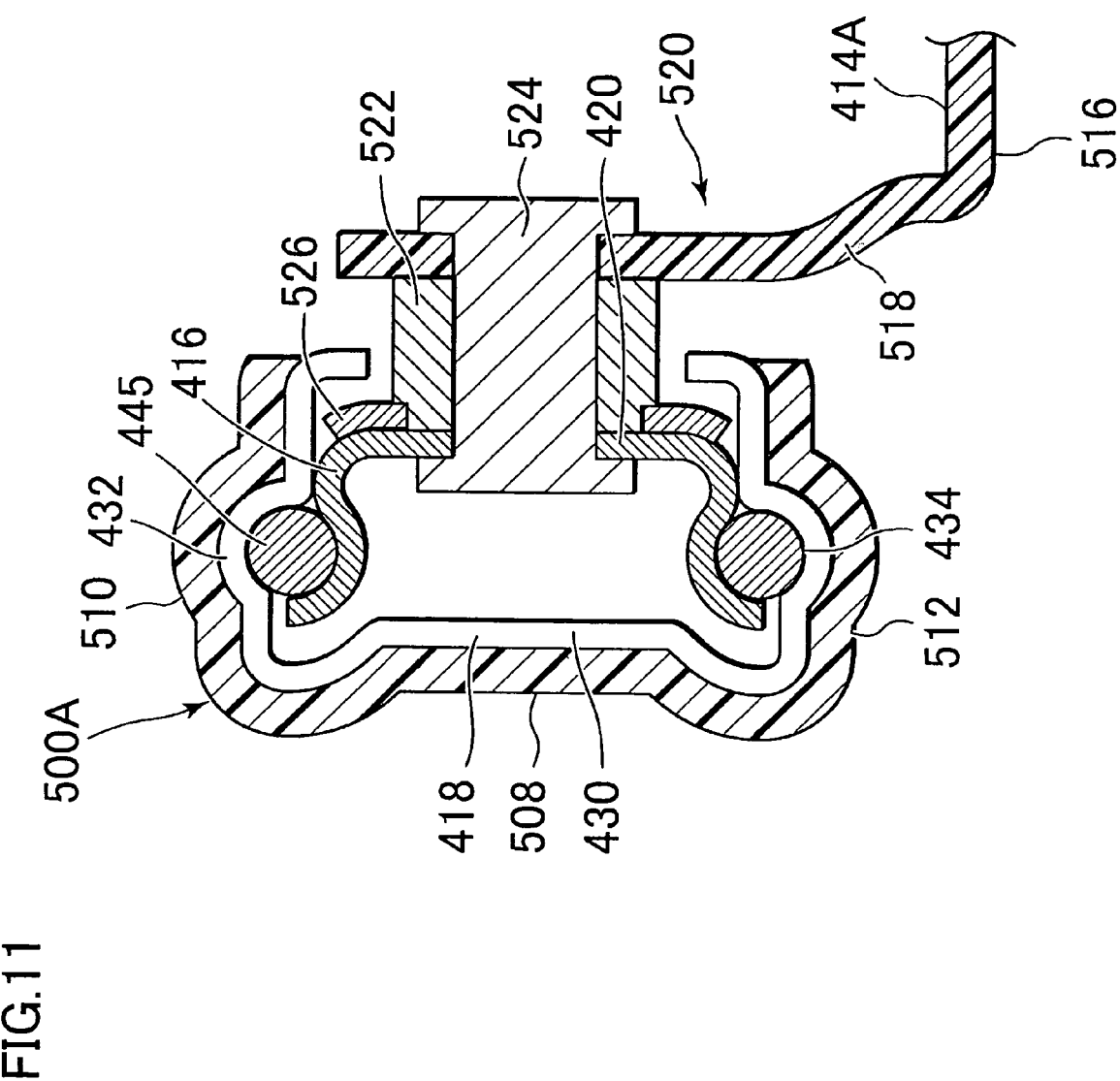
FIG. 11 is a cross-sectional view taken along a line B-B in FIG. 9.

As shown in FIG. 11, the slide cover 500A includes a slide surface 508 oriented vertically to cover the movable side surface 430, a slide protruding upper surface 510 protruding outwardly in the widthwise direction from the upper edge of the slide side surface 508 to cover the movable protruding upper surface 432, and a slide protruding lower surface 512 protruding outwardly in the widthwise direction from the lower edge of the slide side surface 508 to cover the movable protruding lower surface 434. This causes the slide cover 500A to move in the longitudinal direction along the outer surface of the movable inner rail 418 in the longitudinal direction relative to the movable inner rail 418.

As shown in FIG. 9, an end face 504 whose inner surface contacts the front end of the stationary outer rail 416 is provided on the slide cover 500A. The slide cover 500A is rearwardly inserted from the front end portions of the movable inner rail 418 and the stationary outer rail 416 so as to cover said two rails with the end face 504 being oriented forwardly and the opening portion of its C-shaped cross-section being oriented outwardly in the widthwise direction.

As shown in FIG. 9, the slide cover 500A includes at its slide surface 508 a cut-off portion 514 extending in the longitudinal direction. The vertical width W of the cut-off portion 514 is such that it does not contact the link pin of the front link 460. This prevents the longitudinal movement of the slide cover 500 from being blocked due to the contact thereof with the link pin of the front link 460, in a case where the slide cover 500 is moved in the longitudinal direction along the movable inner rail 418. Accordingly, the longitudinal length L of the cut-off portion 514 may be determined from the above technical point of view.

As shown in FIG. 11, the leg 414A on the front portion of the vehicle includes a substantially L-shaped cross-section and two plain portions 516, 518, and the one plain portion 516 forms a surface to be fixed on the floor of the vehicle, while the other plain portion 518 is oriented vertically, and a supporting portion 520 for supporting the side surface 420 of the stationary outer rail 416 from outside in the widthwise direction is provide on the plain portion 518. The supporting portion 520 includes a rivet 524 connecting the side surface 420 of the stationary outer rail 416 and the plain portion 518 via a spacer 522. In addition, a reinforcing plate 526 is provided so as to be applied along the longitudinal direction to the side surface 420 of the stationary outer rail 416 from outside in the widthwise direction. In a case where the belt load is loaded through the belt buckle 438, a shearing force in the vertical direction is exerted on the end portion opposite to the portion of the stationary outer rail 416 where the buckle is provided due to its component in the vertical direction. In this respect, the reinforcing plate 526 is provided only on the stationary outer rail 416, in view of the fact that the strength against such a shearing force can be secured, while at the same time the increase of its weight can be prevented.

Figure 12:
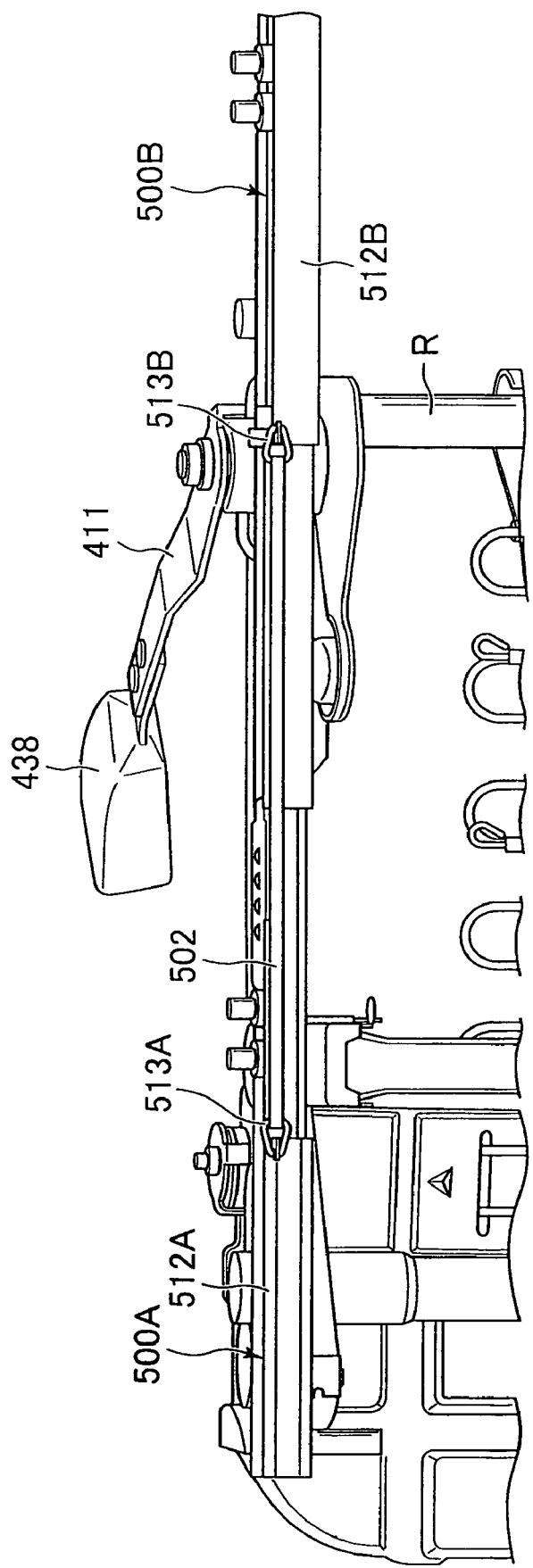
FIG. 12 is a partial plain view showing a slide cover at the front side of the vehicle seen from below in the slide structure of a vehicle seat of the first embodiment of the present invention.

As shown in FIG. 12, one end of an elongated rubber 502 is fixed on the slide protruding lower surface 512A of the slide cover 500A through a hook 513A provided on the slide protruding lower surface 512A, while the other end thereof is fixed on the slide protruding lower surface 512B through a hook 513B provided on the slide protruding lower surface 512B of the slide cover 500B, whereby both of the slide covers 500A, B are always biased toward each other. More specifically, the slide cover 500A is biased rearwardly so that the end face 504A contacts and thus covers the front end of the stationary outer rail 416, while the slide cover 500B is biased forwardly so that the end face 504B contacts and thus covers the rear end of the stationary outer rail 416. The longitudinal length of the elongated rubber 502 may be determined from the above technical point of view. In this connection, the elongated rubber 502 may be provided on the slide protruding upper surface.

Figure 13:
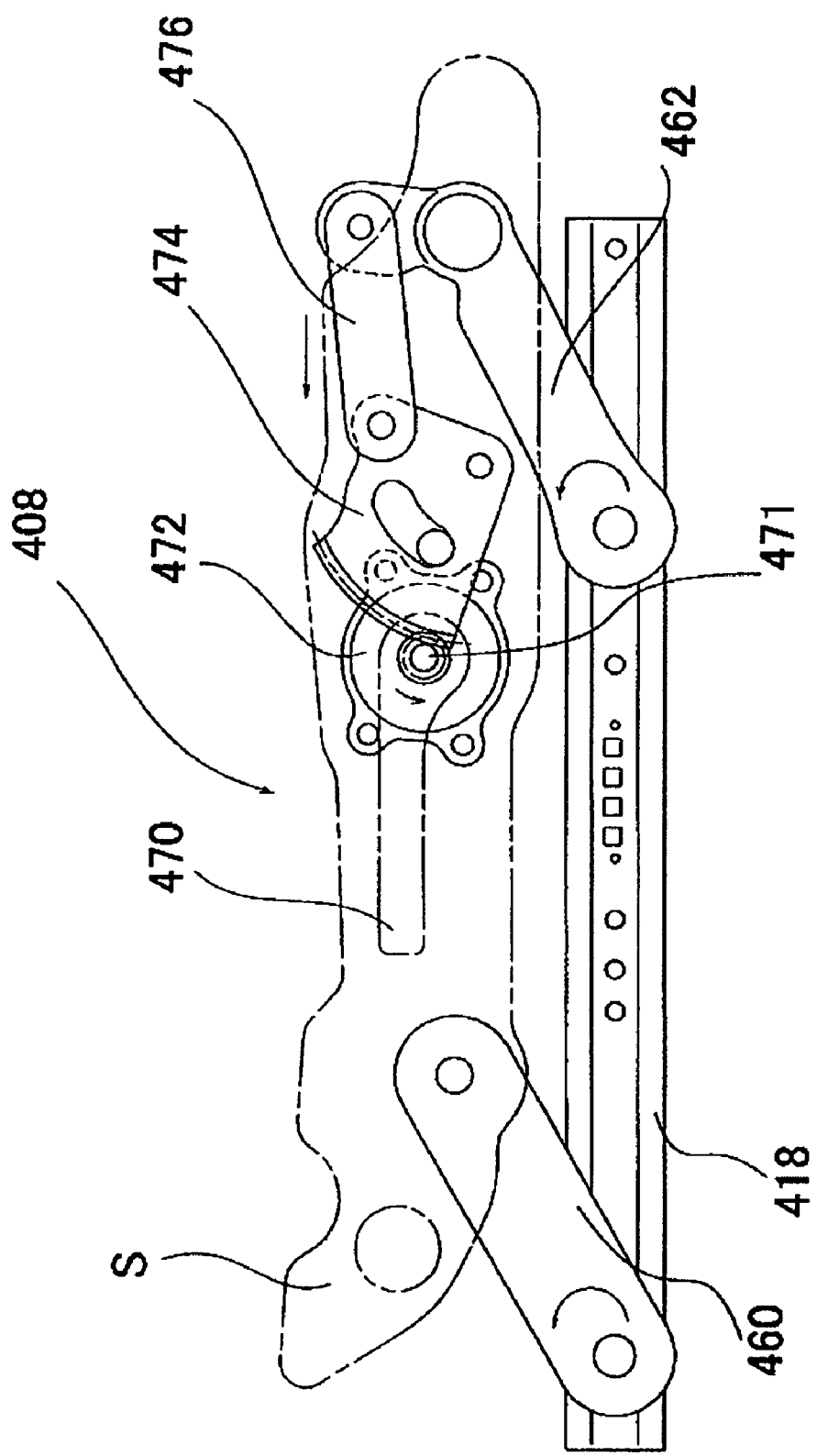
FIG. 13 is a general side view showing a general structure of the mechanism for adjusting the height of the vehicle in the slide structure of a vehicle seat of the first embodiment of the present invention.
Figure 14:
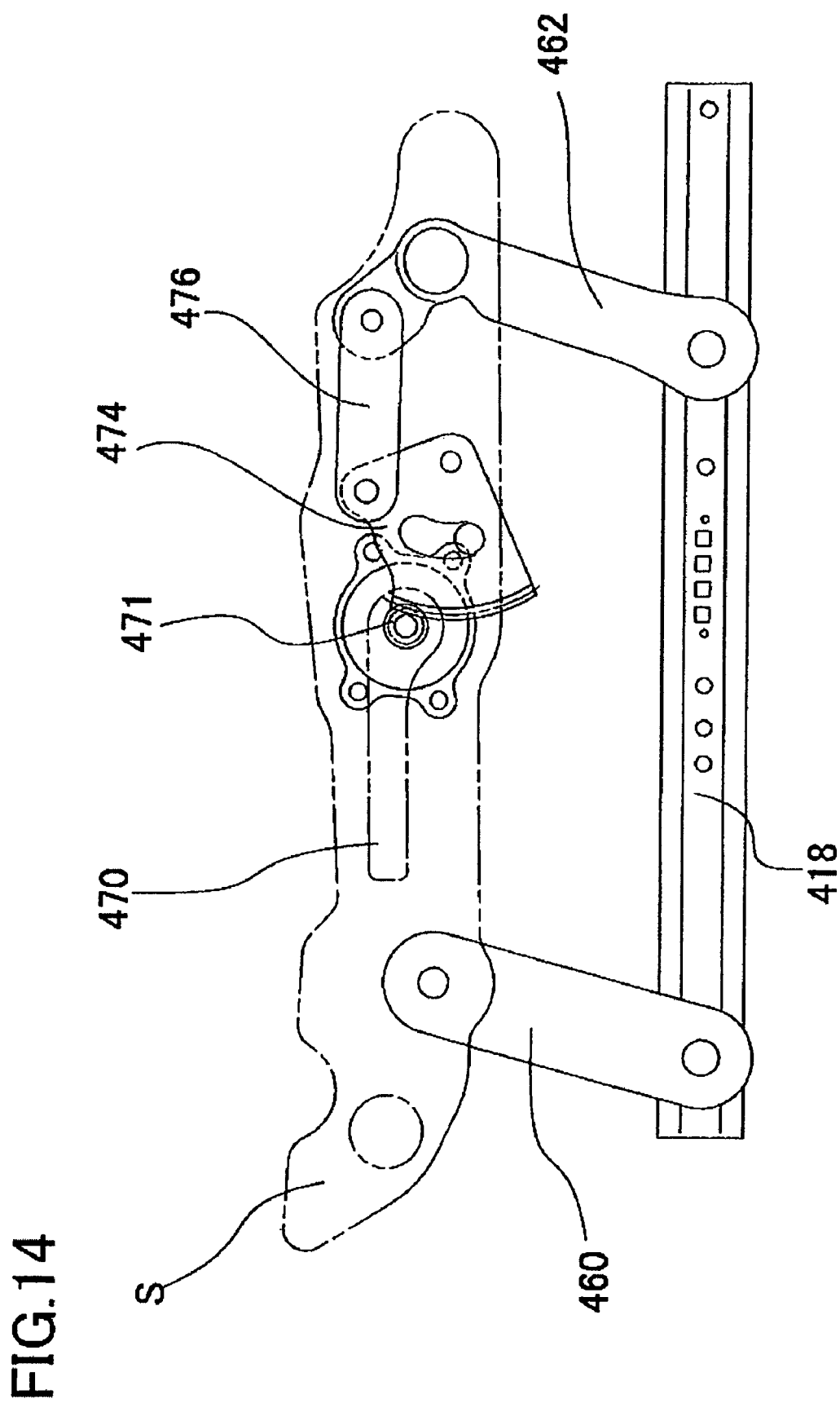
FIG. 14 is a view similar to FIG. 13 showing a situation in which the seat cushion is raised by the mechanism for adjusting the height of the vehicle in the slide structure of a vehicle seat of the first embodiment of the present invention.

As shown in FIGS. 13 and 14, the mechanism 406 for adjusting the vertical position of the vehicle seat comprises a front link 460 and a rear link 462 both forming a parallel link mechanism pinning between the movable inner rail 418 and the corresponding side frame S of the seat cushion. The height of the side frame S can be automatically adjusted by adjusting an angle of the front link 460 or the rear link 462 relative to the movable inner rail 418.

With respect to the mechanism 408 for positioning the vehicle seat in the vertical direction, an actuation lever 470, a pumping brake unit 472 including a pinion gear 471, a sector gear 474, and a connecting bracket 476 are provided on the side of the side frame S. Since the mechanism 408 for positioning the vehicle seat in the vertical direction is the conventional type, the explanation thereabout in detail is omitted. By swinging upwardly the actuation lever 470, the pinion gear 470 provided on the pumping brake unit 472 is rotated, so that the sector gear 474, is rotated in the direction an arrow in FIG. 13 indicates, whereby the connecting bracket 476 is moved in the direction an arrow in FIG. 13 indicates to raise the rear link 462, and thus, the front link 460, and as a result, the height of the side frame S, and thus, the cushion frame is adjusted, while the pinion gear 471 remains not to be rotated even if a downward force acts thereon from the seat cushion side, so that the seat cushion is held to the adjusted height.

An operation of the -slide structure 400 of the vehicle seat including the above construction will be described below with reference to the drawings.

Firstly, when the longitudinal position of the vehicle seat is adjusted, the locking teeth 455 of the locking plate 454 are removed from the movable locking holes 421 of the movable inner rail 418 and the stationary locking holes 428 of the stationary outer rail 416 by raising the actuation lever 446, so that these rails are disengaged from the locking plate 454. As shown in FIG. 2, this causes the movable inner rail 418 to be freely moved in the longitudinal direction relative to the stationary outer rail 416.

Then, the movable inner rail 418 is moved relative to the stationary outer rail 416 in the longitudinal direction to a target position in the longitudinal direction, forwardly, for instance. In such a case, the movable inner rail 418 can be slidably and smoothly moved relative to the stationary outer rail 416 due to the fact that the retainer 412 itself is caused to move in the direction in which the movable inner rail 418 moves by each of the balls 445 rolling between the first protruding stationary upper surface 422 and the first protruding movable upper surface 432 and between the second protruding stationary lower surface 424 and the second protruding movable lower surface 434 with being retained in the perforated holes 447 of the first retainer protruding upper surfaces 442 and the second retainer protruding lower surfaces 444.

Then, by lowering the actuation lever 446, as shown in FIG. 3, the movable inner rail 418 having reached the target position can be locked against and thus fixed on the stationary outer rail 416 by making the locking teeth 455 of the locking plate 454 penetrate into the movable locking holes 421 of the movable inner rail 418 and the stationary locking holes 428 of the stationary outer rail 416 corresponding to the target position.

As stated above, according to the above slide structure 400 of the vehicle seat, in a case where the longitudinal position of the seat cushion C is adjusted, the vehicle seat fixed on the movable inner rail 418 can be positioned at a desired position in the longitudinal direction of the vehicle by moving the movable inner rail 418 relative to the stationary outer rail 416 fixed on the vehicle floor, in the longitudinal direction in a sliding manner, while the vertical position of the seat cushion C can be adjusted by moving the seat cushion C relative to the movable inner rail 418 by the mechanism for adjusting the vertical position of the seat cushion C.

In such a case, since the slide cover 500 with a substantially C-shaped cross-section fitting over the movable inner rail 418 with the opening portion of its C-shaped cross-section being oriented outwardly in the widthwise direction is provided on each end of the stationary outer rail 416, the sliding portion to which grease is applied can be covered to be concealed from outside, while a hand of a passenger can be kept away from the sliding portion even if the hand is inserted below the seat cushion, whereby the slide structure of the seat cushion which is capable of maintaining the aesthetic external appearance and the safety of the vehicle cushion can be provided.

The motion of the slide cover 500 will be described below in a case where the seat cushion is moved in the longitudinal direction from the most rear position to the most front position.

Figure 15:
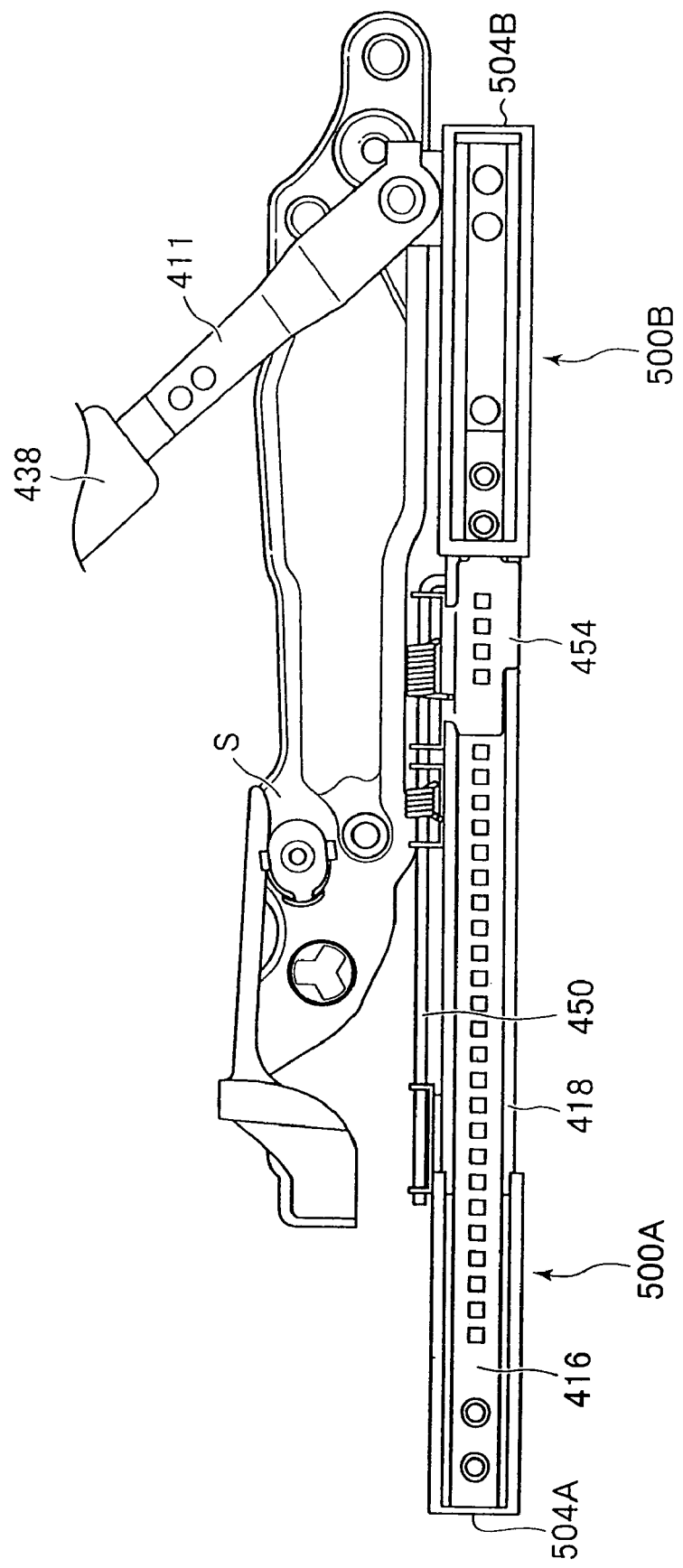
FIG. 15 is a partial side view showing a situation in which the seat cushion is at the most rearward position in the slide structure of a vehicle seat of the first embodiment of the present invention.

FIG. 15 shows a situation in which the seat cushion is situated to be the most rearward position. In this situation, the movable inner rail 418 is located to be the most rearward position so that its front end portion is retracted rearwardly from the front end portion of the stationary outer rail 416, while its rear end portion protrudes rearwardly from the rear end portion of the stationary outer rail 416 to overhang. This causes the slide cover 500A at the front portion to be biased rearwardly by the elongated rubber 502, whereby the inner surface of the end face 504A of the slide cover 500A contacts the front end face of the stationary outer rail 416, while causing the rear end portion of the slide cover 500A to fit over the front end portion of the movable inner rail 418, and thus, be supported thereby, whereby the slide cover 500A can be prevented from being slipped off from the movable inner rail 418.

On the other hand, the slide cover 500A at the rear side is in a situation in which the inner surface of the end face 504B contacts the rear end portion of the movable inner rail 418 against the biasing force in the forward direction generated by the elongated rubber 502. This causes the stationary outer rail 416 to be covered by the slide cover 500A at the front side, whereby the outer surface of the stationary outer rail 416 is not exhibited outside, while the movable inner rail 418 is covered by the slide cover 500B at the rear side, whereby the outer surface of the movable inner rail 418 is not exhibited outside, so that the aesthetic external appearance and the safety of the vehicle seat can be secured.

Figure 16:
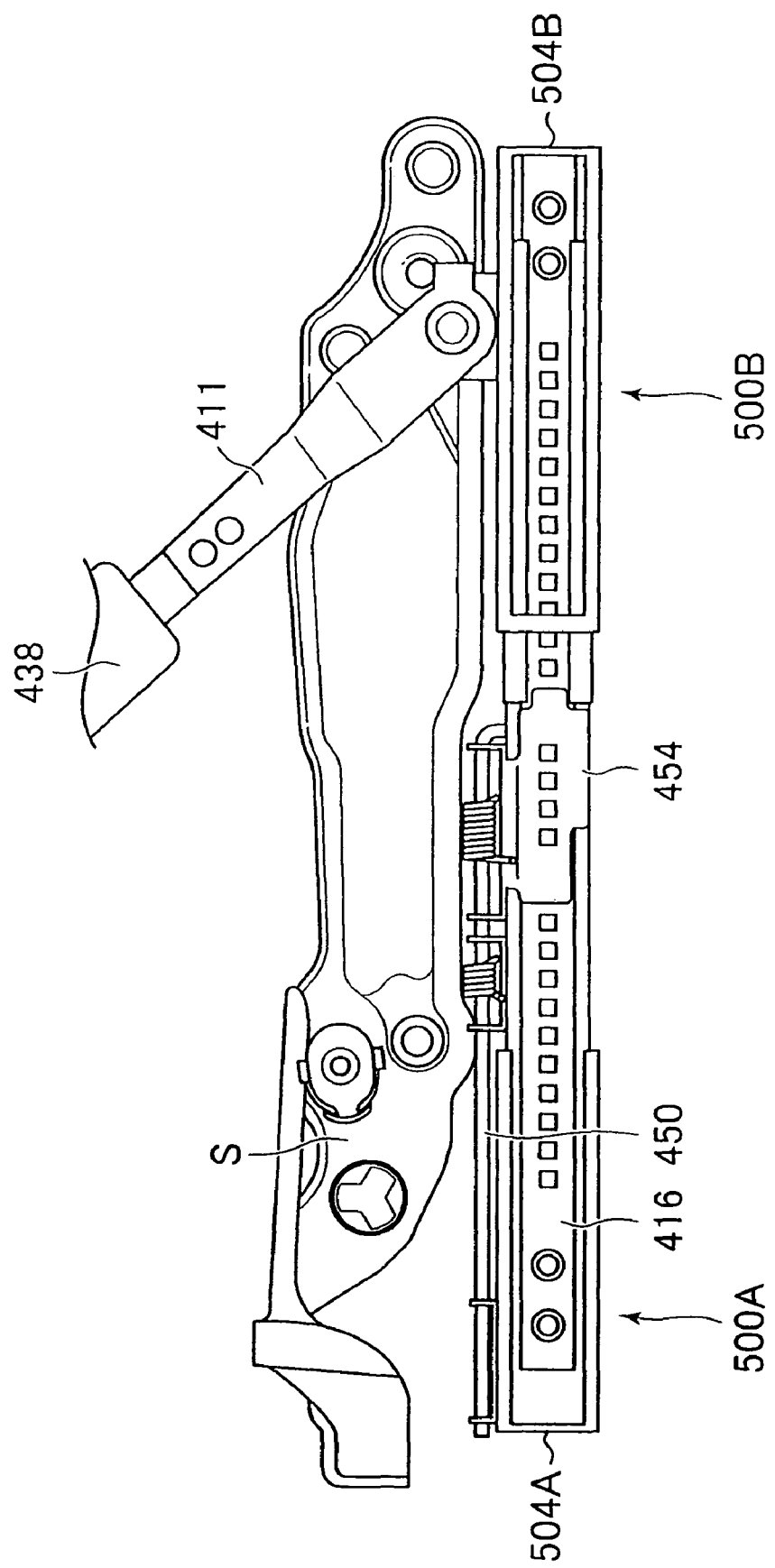
FIG. 16 is a partial side view showing a situation in which the seat cushion is between the most rearward position and the most frontal position in the slide structure of a vehicle seat of the first embodiment of the present invention.

FIG. 16 shows a situation in which the seat cushion is situated to be an intermediate position between the most rearward position and the most frontal position. The front end portion of the movable inner rail 418 contacts the inner surface of the end face 504A of the slide cover 500A at the front side by forwardly moving the movable inner rail 418 relative to the stationary outer rail 418, so that the slide cover 500A at the front side is forwardly moved along with the movable inner rail 418 against the biasing force in the rearward direction generated by the elongated rubber 502. On the other hand, the slide cover 500B at the rear side is forwardly moved along with the movable inner rail 418, while the movable inner rail 418 is kept covered by the slide cover 500B by the biasing force in the forward direction generated by the elongated rubber 502 until the inner surface of its end face 504B contacts the rear end portion of the stationary outer rail 416.

In such a case, based on the fact that the leg 414A includes a substantially L-shaped cross-section and that the plain portion 516 forms a surface to be fixed on the floor of the vehicle, while the supporting portion 520 for supporting the side surface of the stationary outer rail 416 from outside in the widthwise direction is provided on the plain portion 518, since the opening portion extending in the longitudinal direction of the C-shaped cross-section of the slide cover 500 is oriented outwardly in the widthwise direction, while the cut-off portion extending in the longitudinal direction with a vertical width sufficient to evade the link pin of the front link 460 is provided on the side surface of the slide cover 500, the slide cover 500 can smoothly move in the longitudinal direction so as not to collide with the supporting portion 520 of the leg and the link pin, in a case where the slide cover 500 is forwardly moved along with the movable inner rail 418 relative to the stationary outer rail 418.

Figure 17:
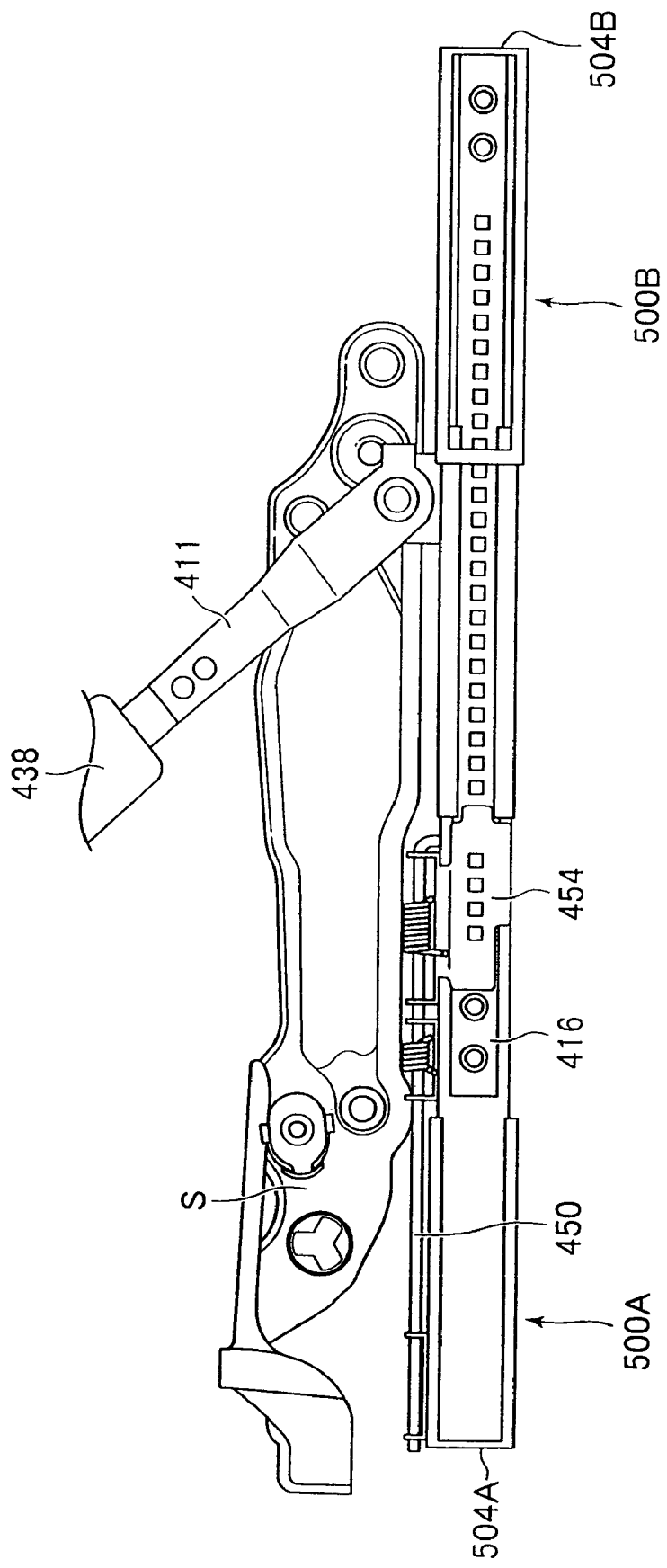
FIG. 17 is a partial side view showing a situation in which the seat cushion is at the most frontal position in the slide structure of a vehicle seat of the first embodiment of the present invention.

FIG. 17 shows a situation in which the seat cushion is situated to be the most frontal position. In this situation, the movable inner rail 418 is located to be the most frontal position so that its rear end portion is retracted forwardly from the rear end portion of the stationary outer rail 416, while its front end portion protrudes forwardly from the front end portion of the stationary outer rail 416 to overhang it. This causes the inner surface of the slide cover 500A at the front side to contact the front end surface of the movable inner rail 418 against the basing force in the rearward direction generated by the elongated rubber 502. On the other hand, with respect to the slide cover 500B at the rear side, the inner surface of its end face 504B is kept contacting the rear end portion of the stationary outer rail 416 by the biasing force in the forward direction generated by the elongated rubber 502. This causes the movable inner rail 418 to be covered by the slide cover 500A at the front side, thereby causing the outer surface of the movable inner rail 418 not to be exhibited outside, while this causes the stationary outer rail 416 to be covered by the slide cover 500B at the rear side, thereby causing the outer surface of the stationary outer rail 416 not to be exhibited outside, and as a result, the aesthetic external appearance and the safety of the vehicle seat can be secured.

According to the slide structure of the vehicle seat of the present invention, since the a slide cover with a substantially C-shaped cross-section is provided on the end portion of the stationary outer rail so as to fit over the movable inner rail with the opening portion of its C-shaped cross-section being oriented outwardly in the widthwise direction, the sliding portion between the movable inner rail and the stationary outer rail to which grease is applied can be covered so as not to be seen from outside, while at the same time a hand of a passenger can be kept away from the sliding portion even when the hand is inserted blow the seat cushion, whereby the present slide structure of the vehicle seat is technically advantageous in a vehicle industry in that the slide structure of the cushion seat, which is capable of maintaining the aesthetic external appearance and the safety of the vehicle seat, can be provided.

A second embodiment of the present invention will be described with reference to the drawings. In the following description, with respect to the same elements as those in the first embodiment, an explanation thereabout is omitted by attaching the same reference numbers to those elements, and the technical feature of this embodiment will be described in detail.

The technical feature of this embodiment lies in the fact that the structure and the supporting configuration of the slide cover are modified by the fact that the stationary outer rail and the movable inner rail being disposed inside and outside in the widthwise direction of the vehicle, respectively, and that the slide cover is provided only on the front portion of each of the two rails, whereas, in the first embodiment, the stationary outer rail and the movable inner rail being disposed outside and inside in the widthwise direction of the vehicle, respectively, and the slide cover is provided on each of the front and the rear portions of each of the two rails.

This is because, in the first embodiment, the slide cover is intended to be applied to the automobile, so that, since, upon the collision of the automobile, a force is generated at the front portion of the vehicle so as to lose the fitting relationship between the movable rail fixed on the side frame of the cushion frame and the stationary rail fixed on the floor of the vehicle due to the belt load acting on the rear portion of the vehicle, in order to prevent such a loss to always maintain such a fitting relationship, the movable and the stationary rails are disposed to be inside and outside, respectively, while, in this embodiment, the slide cover is intended to be applied to a general vehicle, so that, since there may be a case where no belt is mounted on the seat back, it is not necessary to take into consideration the risk that the above fitting relationship between the two rails can be lost due to the belt load, and as a result, the movable and the stationary rails are disposed to be outside and inside in the widthwise direction, respectively.

Figure 18:
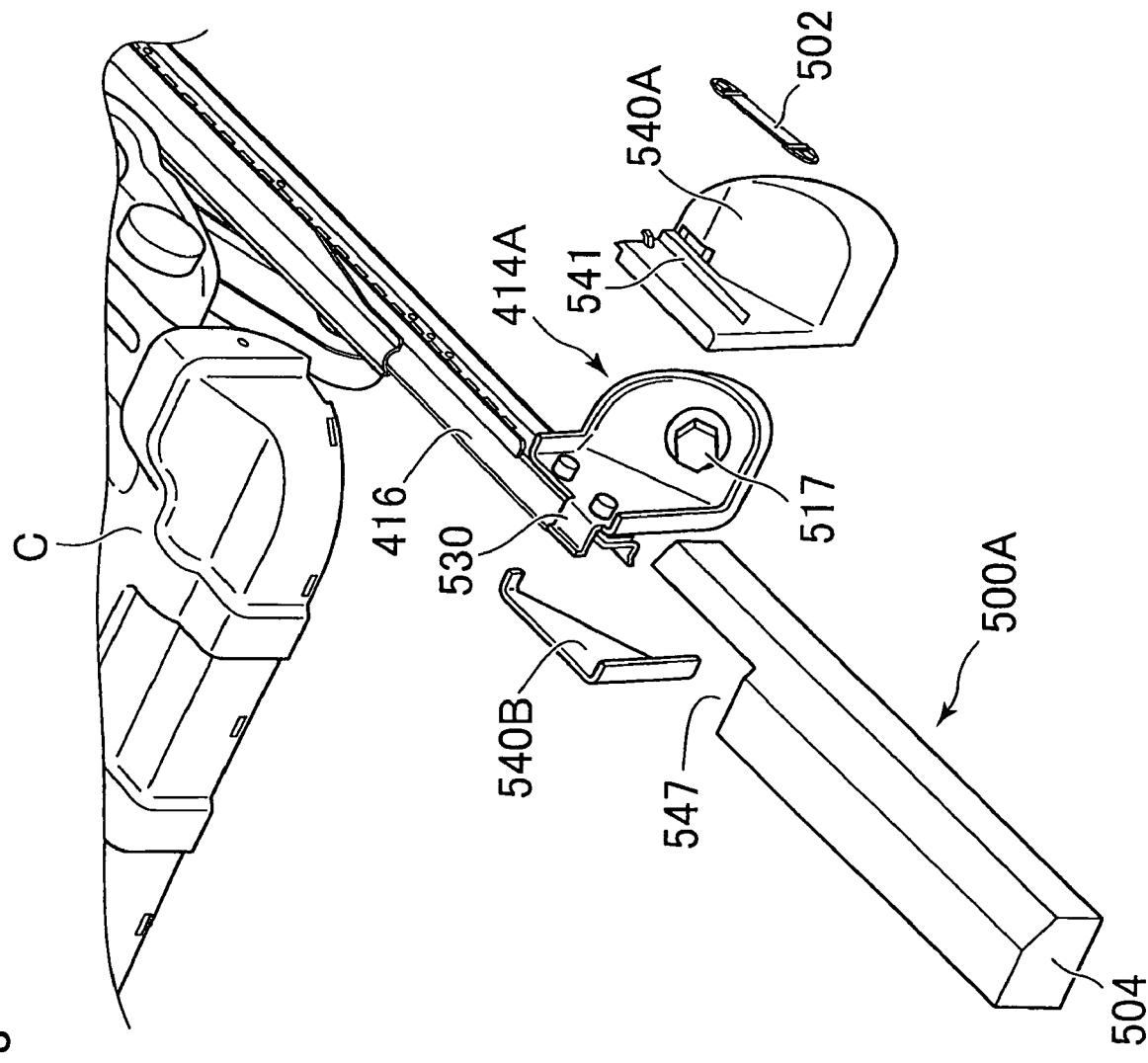
FIG. 18 is a view similar to FIG. 9 in the slide structure of a vehicle seat of the second embodiment of the present invention.
Figure 19:
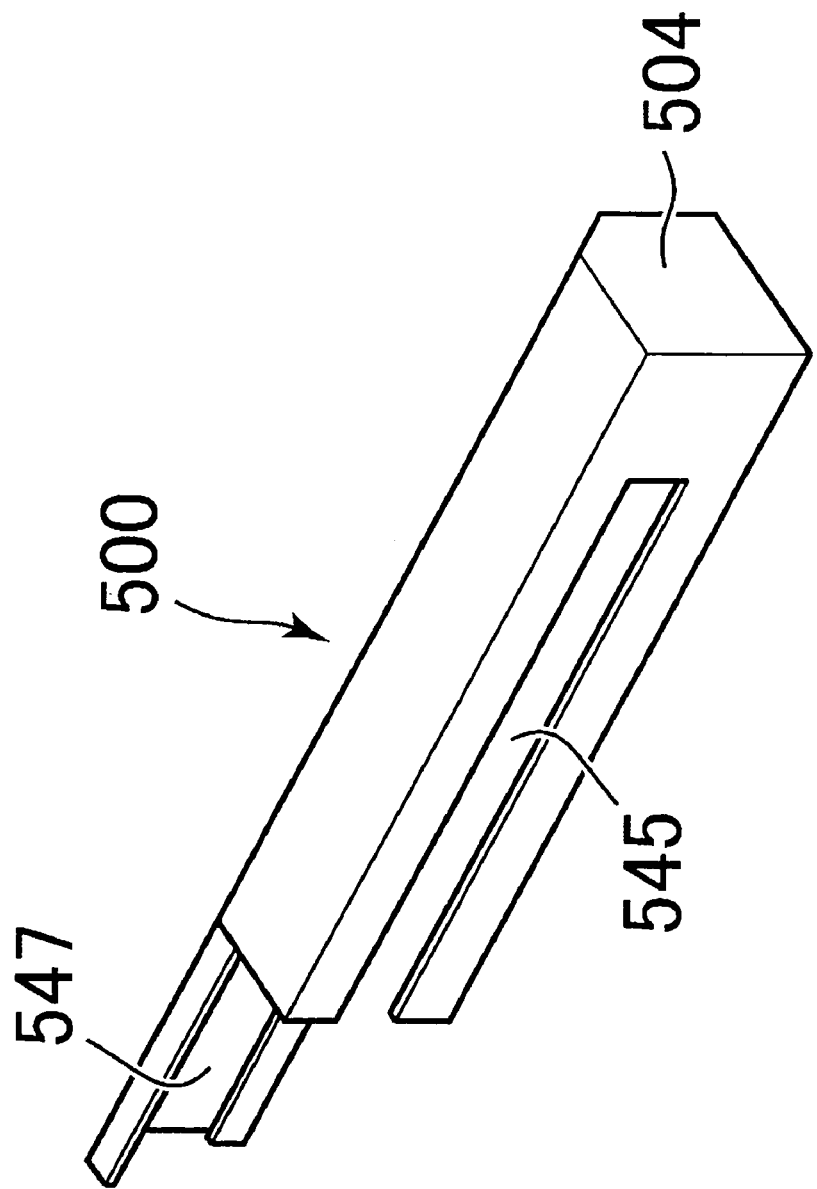
FIG. 19 is a perspective view showing a slide cover provided on the front portion of the vehicle in the slide structure of a vehicle seat of the second embodiment of the present invention.

More specifically, as shown in FIG. 18, the slide cover 500A extends in the longitudinal direction so as to cover the stationary inner rail 416 and the 5 lege 414A from above and includes an end face 504A, an inner surface of which contacts an end of the stationary inner rail 416. As shown in FIG. 19, the slide cover 500A includes, at its inner side surface, a first cut-off 545 extending in the longitudinal direction the width of which is such that the first cut-off 545 does not contact a link pin of the front link 460 when the slide cover 500A is moved in the longitudinal direction and, at its upper surface, a second cut-off 547 extending in the longitudinal direction, the width of which is such that the second cut-off 547 does not contact the bracket of the slide structure.

Figure 20:
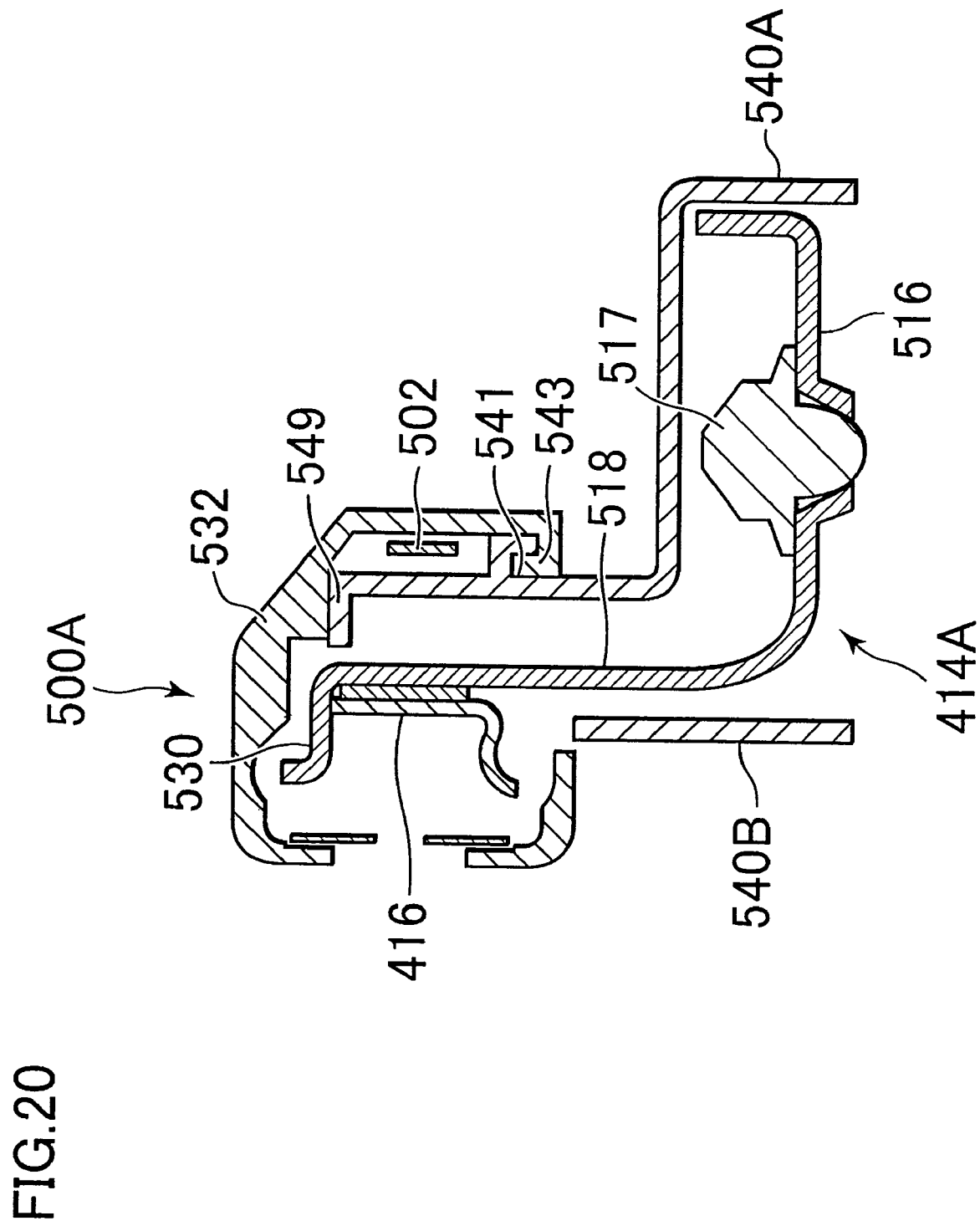
FIG. 20 is a cross-sectional view showing a slide cover provided on the front portion of the vehicle in the slide structure of a vehicle seat of the second embodiment of the present invention.

As shown in FIG. 20, the leg 414A includes a substantially L-shaped cross-section and its plain portion 516 forms a fixed surface which is fixed on the floor of the vehicle by a pin 517 and its plain portion 518 is oriented to be vertical. A flange portion 530 which inwardly and horizontally protrudes and fixes the stationary inner rail 416 on its lower surface and thus supports it thereby is provided on an upper edge of the plain portion 518. A space through which the movable outer rail 418 passes is formed below the flange portion 530.

A leg cover 540 is provided on the leg 414A and a concave portion 541, which extends in the longitudinal direction so as to guide the slide cover 500A, is provided on an outer side surface portion of the leg cover 540A covering the leg 414A from outside. On the other hand, a convex portion 543 which fits into the concave portion 541 from below and extends in the longitudinal direction is provided on the slide cover 500A. A flange 549 protruding inwardly in the widthwise direction is provided on the upper portion of the leg cover 540A, while the slide cover 500A includes a resting portion 532 extending in the longitudinal direction which rests on the flange 549.

An elongate rubber 502, one front end of which is connected to the slide cover 500A, while the rear end of which is connected to the leg cover 540A to always bias the slide cover 500A toward the stationary inner rail 416, is provided on the outer side surface portion of the leg cover 540A, like the first embodiment.

As described above, since the slide cover 500A extending in the longitudinal direction so as to cover the stationary inner rail 416 and the leg 414A from above is provided on the end portion of the stationary inner rail 416, the sliding portion to which grease is applied can be concealed so as not to be seen from outside, while at the same time, a hand of a passenger can be blocked so as not extend to the sliding portion, even if the hand is inserted below the vehicle seat, whereby the slide structure of the seat cushion which is capable of maintaining the aesthetic external appearance and the safety of the vehicle seat can be provided.

For instance, in a case where the seat cushion is positioned to be the most frontal position, when the movable outer rail 418 is moved forwardly in the longitudinal direction relative to the stationary inner rail 416, the front end of the movable outer rail 418 contacts the inner surface of the end face 504 of the slide cover 500A, the slide cover 500A along with the movable outer rail 418 is moved forwardly in the longitudinal direction while it rests on the leg 414A through the resting portion 532 and is guided along the leg 414A through a fitting relationship between the convex portion 543 and the concave portion 541.

In such a case, since the leg 414A includes a substantially L-shaped cross-section, the plain portion 516 forms the surface to be fixed on the floor of the vehicle, while the other plain portion 518 is oriented vertically, and the flange portion 530 protruding inwardly and horizontally and supporting the stationary inner rail 416 at its lower surface is provided on the upper edge of the other plain portion 518, and the space through which the movable outer rail 418 passes is formed below the flange portion 530, the leg 414A fixes, the stationary inner rail 416 from above outside, while a space through which the movable outer rail 418 passes can be secured in a case where the movable outer rail 418 interposed between the leg 414A and the stationary inner rail 416 is moved in the longitudinal direction.

On the other hand, in a case where the seat cushion is moved rearwardly in the longitudinal direction from the most frontal position, since the slide cover 500A is biased toward the stationary inner rail 416 by the elongated rubber, one end of which is fixed on the slide cover 500A, the slide cover 500A can be moved rearwardly independent of the rearward movement of the movable outer rail 418, the end portion of the stationary inner rail 416 can be always covered by the fact that the slide cover 500A is moved due to such a biasing force to the front end portion of the stationary inner rail 416, even when the front end of the movable outer rail 418 is located to be retracted rearwardly from the front end of the stationary inner rail 416.

As described above, the preferred embodiments of the present invention were described in detail, however, it is evident that those skilled in the art could modify or change the embodiments in various manners without departing from the scope of the present invention.

For instance, in the first embodiment, the sliding structure is applied to an automobile, while, in the second embodiment, it is applied to a general transportation vehicle, however, the sliding structure in the first embodiment may be applied to general transportation vehicles such as railway vehicles/ships, airplanes, roller coasters in a park, etc.

Further, in the second embodiment, the slide cover is provided only on the front end of the rail, however, the slide cover may be provided on both of the front and rear ends of the vehicle.

What is claimed is:

1. A slide structure of a vehicle seat which positions a seat cushion in a longitudinal direction of a vehicle comprises a stationary outer rail which extends in the longitudinal direction of the vehicle and is fixed on a vehicle floor and includes a substantially C-shaped cross-section, an opening portion of which is oriented inwardly in a widthwise direction of the vehicle and is disposed to exhibit an elongated cross-section in a vertical direction of the vehicle,
   and a movable inner rail which extends in the longitudinal direction of the vehicle and fits over said stationary outer rail so as to be slidable in the longitudinal direction of the vehicle relative to said stationary outer rail and is fixed on the seat cushion and includes a substantially C-shaped cross-section, an opening portion of which is oriented outwardly in the widthwise direction of the vehicle and is disposed to exhibit an elongated cross-section in the vertical direction of the vehicle,
   said movable inner rail fits with said stationary outer rail with the opening portions formed by the respective substantially C-shaped cross-sections facing each other in such a way that, in a case where said seat cushion is positioned to be the most frontal position, a front end of said movable inner rail protrudes forwardly from a front end of said stationary outer rail, while, in a case where said seat cushion is positioned to be the most rearward position, a rear end of said movable inner rail protrudes rearwardly from a rear end of said stationary outer rail,
   said slide structure further comprises a slide cover which is provided on an end portion of the stationary outer rail and includes a substantially C-shaped cross-section, said slide cover fits over said movable inner rail in the longitudinal direction with its opening portion formed by the substantially C-shaped cross-section being oriented outwardly in the widthwise direction and includes an end face whose inner surface contacts an end of said stationary outer rail, a longitudinal length of said slide cover is set to be longer than a distance from said end of said stationary outer rail on which said slide cover is provided to an end of said movable inner rail when said movable inner rail reaches a position where said end of said movable inner rail at the side of said end of said stationary outer rail is situated to be the farthest from said end of said stationary outer rail,
   said slide structure further comprises a means for biasing said slide cover toward said stationary outer rail one end of which is fixed on said slide cover.

2. The slide structure of the vehicle seat according to claim 1, wherein said slide structure further comprises a leg which is fixed on a floor of the vehicle and fixes and thus supports said end portion of said stationary outer rail, said leg comprises a substantially L-shaped cross-section and one plain portion of which forms a surface to be fixed on the vehicle floor, while the other plain portion of which is oriented in the substantially vertical direction and includes a supporting portion for supporting a side surface of said stationary outer rail from outside in the widthwise direction.

3. The slide structure of the vehicle seat according to claim 2, wherein said leg includes a front leg for fixing and supporting said front portion of said stationary outer rail and a rear leg for fixing and supporting said rear portion of the stationary outer rail, said front and rear legs are spaced apart from each other in the longitudinal direction, first and second slide covers are provided on the front and rear ends of the stationary outer rail, respectively, the first slide cover provided on the front end portion of the stationary outer rail includes an end face an inner surface of which contacts a front end of the stationary outer rail, the second slide cover provided on the rear end portion of the stationary outer rail includes an end face an inner surface of which contacts a rear end of the stationary outer rail, one end and the other end of said biasing means are connected to said first and second slide covers, respectively, a supporting portion of said front leg includes a rivet connecting a side surface of the stationary outer rail and the other of the plain portions of the front leg through a spacer, a supporting portion of said rear leg includes a rivet connecting the side surface of the stationary outer rail and the other of the plain portions of the rear leg through a spacer, said slide structure of the vehicle seat further comprises a reinforcing plate which is applied to said side surface of the stationary outer rail from outside in the widthwise direction along the longitudinal direction.

4. The slide structure of the vehicle seat according to claim 1, wherein said stationary outer rail comprises a stationary side surface oriented vertically, a stationary protruding upper surface protruding inwardly in the widthwise direction from an upper edge of said stationary side surface, and a stationary protruding lower surface protruding inwardly in the widthwise direction from a lower edge of said stationary side surface, said movable inner rail comprises a movable side surface oriented vertically, a movable protruding upper surface protruding outwardly in the widthwise direction from an upper edge of said movable side surface, and a movable protruding lower surface protruding outwardly in the widthwise direction from a lower edge of said movable side surface, and said slide cover comprises a slide side surface oriented vertically for covering said movable side surface, a slide protruding upper surface protruding outwardly in the widthwise direction from an upper edge of said slide side surface for covering said movable protruding upper surface, and a slide protruding lower surface protruding outwardly in the widthwise direction from a lower edge of said slide side surface for covering said movable protruding lower surface.

5. The slide structure of the vehicle seat according to claim 1, wherein said slide cover includes at its slide side surface a cut-off portion extending in the longitudinal direction, and a vertical width of the cut-off portion is set so as not to contact a link pin of a front link.

6. The slide structure of the vehicle seat according to claim 1, wherein said biasing means is made of an elongated rubber and is disposed to be along said slide protruding upper surface or said slide protruding lower surface.

7. A slide structure of a vehicle seat which positions a seat cushion in a longitudinal direction of a vehicle comprises a stationary inner rail which extends in the longitudinal direction of the vehicle and includes a substantially C-shaped cross-section and is disposed to exhibit an elongated cross-section in a vertical direction of the vehicle, and a movable outer rail which extends in the longitudinal direction of the vehicle and fits with said stationary inner rail so as to be slidable in the longitudinal direction of the vehicle relative to said stationary inner rail and is fixed on the seat cushion and includes a substantially C-shaped cross-section and is disposed to exhibit an elongated cross-section in the vertical direction of the vehicle, said movable outer rail fits into said stationary inner rail with the opening portions formed by the respective substantially C-shaped cross-sections facing each other in such a way that, in a case where said seat cushion is positioned to be the most frontal position, a front end of said movable outer rail protrudes forwardly from a front end of said stationary inner rail, while, in a case where said seat cushion is positioned to be the most rearward position, a rear end of said movable outer rail protrudes rearwardly from a rear end of said stationary inner rail, said slide structure further comprises a slide cover which is provided on an end portion of the stationary inner rail, said slide cover extends in the longitudinal direction so as to cover said stationary inner rail from above and includes an end face whose inner surface contacts an end of said stationary inner rail, said slide structure further comprises a means for biasing said slide cover toward said stationary inner rail one end of which is fixed on said slide cover.

8. The slide structure of the vehicle seat according to claim 7, wherein said slide structure further comprises a leg which extends in the longitudinal direction and is fixed on a floor of the vehicle and fixes and thus supports said end portion of said stationary inner rail, said leg comprises a substantially L-shaped cross-section and one plain portion of which forms a surface to be fixed on the vehicle floor, while the other plain portion of which is oriented in the substantially vertical direction and includes at its upper edge an inwardly and horizontally protruding flange portion which fixes and thus supports said stationary inner rail at its lower surface, a space through which said movable outer rail passes is formed below said flange portion, said slide cover extends in the longitudinal direction so as to cover said stationary inner rail and said leg from above, a resting portion which rests on said leg and a guided portion which is guided in the longitudinal direction along said leg are provided on said slide cover.

* * * * *